United States Patent
Horimai

(10) Patent No.: US 7,065,032 B2
(45) Date of Patent: Jun. 20, 2006

(54) APPARATUS AND METHOD FOR RECORDING/REPRODUCING OPTICAL INFORMATION

(75) Inventor: Hideyoshi Horimai, Tokyo (JP)

(73) Assignee: Optware Corporation, Kanagawa (JP)

( * ) Notice: Subject to any disclaimer, the term of this patent is extended or adjusted under 35 U.S.C. 154(b) by 509 days.

(21) Appl. No.: 10/332,057

(22) PCT Filed: Jun. 25, 2001

(86) PCT No.: PCT/JP01/05389

§ 371 (c)(1),
(2), (4) Date: Jan. 2, 2003

(87) PCT Pub. No.: WO02/03145

PCT Pub. Date: Jan. 10, 2002

(65) Prior Publication Data
US 2004/0100892 A1    May 27, 2004

(30) Foreign Application Priority Data
Jul. 5, 2000   (JP) ............................. 2000/203563
Oct. 16, 2000  (JP) ............................. 2000/315224

(51) Int. Cl.
G11B 7/135   (2006.01)
(52) U.S. Cl. .................................. 369/103; 369/112.17
(58) Field of Classification Search ...................... None
See application file for complete search history.

(56) References Cited

U.S. PATENT DOCUMENTS

| | | | | |
|---|---|---|---|---|
| 4,012,108 A | * | 3/1977 | Ishii et al. | 369/103 |
| 4,104,489 A | * | 8/1978 | Satoh et al. | 369/103 |
| 4,993,789 A | * | 2/1991 | Biles et al. | 369/103 |
| 5,319,629 A | * | 6/1994 | Henshaw et al. | 369/103 |
| 5,377,179 A | * | 12/1994 | Redfield | 369/103 |
| 5,719,691 A | * | 2/1998 | Curtis et al. | 369/103 |
| 5,917,798 A | | 6/1999 | Horimai et al. | |

FOREIGN PATENT DOCUMENTS

EP     1065658     1/2001

(Continued)

OTHER PUBLICATIONS

Kinoform using an electrically controlled birefringent liquid-crystal spatial light modulator; Applied Optics/ vol. 30, No. 32/Nov. 10, 1991/ pp. 4622-4628.

(Continued)

*Primary Examiner*—Brian E. Miller
*Assistant Examiner*—Peter Vincent Agustin
(74) *Attorney, Agent, or Firm*—Cowan Liebowitz & Latman P.C.; Mark Montague

(57) ABSTRACT

Apparatus and method for recording and reproducing optical information using holography is designed to provide a small configuration and to improve the S/N ratio of reproduced information. During recording, a phase spatial light modulator generates information light spatially modulated in phase based on information to be recorded, and recording-specific reference light, that irradiate an information recording layer of an optical recording medium to record the information in the form of an interference pattern, resulting from interference between the information light and the recording-specific reference light. During reproduction, reproduction-specific reference light irradiates the information recording layer to generate reproduction light which is superimposed on the reproduction-specific reference light to generate composite light. The composite light is detected by a photodetector to reproduce the information.

26 Claims, 15 Drawing Sheets

FOREIGN PATENT DOCUMENTS

| | | |
|---|---|---|
| JP | 03-052126 | 3/1991 |
| JP | 03-288338 | 12/1991 |
| JP | 06-266274 | 9/1994 |
| JP | 10-302293 | 11/1998 |
| JP | 11-133842 | 5/1999 |

OTHER PUBLICATIONS

O plus E, No. 201, Kabushikikaisya shingijutu Communications, Aug., 1996, p. 105-106.

* cited by examiner

APPARATUS AND METHOD FOR RECORDING/REPRODUCING OPTICAL INFORMATION

TECHNICAL FIELD

The present invention relates to an optical information recording apparatus and method for recording information on an optical information recording medium through the use of holography, an optical information reproducing apparatus and method for reproducing information from an optical information recording medium through the use of holography, and an optical information recording/reproducing apparatus and method for recording information on an optical information recording medium and reproducing the information from the optical information recording medium through the use of holography.

BACKGROUND ART

Holographic recording for recording information on a recording medium through the use of holography is typically performed by superimposing light that carries image information on reference light within the recording medium and by writing a resultingly generated interference pattern onto the recording medium. For reproducing the information recorded, the recording medium is irradiated with reference light so that the image information is reproduced through diffraction derived from the interference pattern.

Recently, volume holography, or digital volume holography in particular, has been developed and is attracting attention in practical fields for ultra-high density optical recording. Volume holography is a method for writing a three-dimensional interference pattern by making positive use of a recording medium in the direction of thickness as well, and is characterized in that an increase in thickness can enhance the diffraction efficiency and a greater recording capacity can be achieved by employing multiplex recording. Digital volume holography is a computer-oriented holographic recording method which uses the same recording medium and recording method as with the volume holography, whereas the image information to be recorded is limited to binary digital patterns. In the digital volume holography, analog image information such as a picture is once digitized and developed into two-dimensional digital pattern information, and then it is recorded as image information. For reproduction, this digital pattern information is read and decoded to restore the original image information for display. Consequently, even if the SN ratio (signal-to-noise ratio) in the reproduction is somewhat poor, differential detection and/or error correction on encoded binary data enable to reproduce the original information with extremely high fidelity.

Now, in a conventional optical information recording/reproducing method for recording and reproducing information through the use of holography, information light is generated by spatially modulating the intensity of light based on the information to be recorded, and, an interference pattern resulting from interference between this information light and recording-specific reference light is recorded on a recording medium, to thereby record the information. To reproduce the information thus recorded, the recording medium is irradiated with reproduction-specific reference light. This reproduction-specific reference light is then diffracted by the interference pattern to generate reproduction light corresponding to the information light. Like the information light, this reproduction light is light that is spatially modulated in intensity.

By the way, the conventional optical information recording/reproducing method has had a problem that the reproduced information deteriorates in S/N ratio if the reproduction-specific reference light is also incident on a photodetector for detecting the reproduction light. For that reason, for the conventional optical information recording/reproducing method, the information light and the recording-specific reference light are in most cases allowed to be incident on the recording medium with a predetermined angle therebetween at the time of recording, so that the reproduction light and the reproduction-specific reference light can be spatially separated from each other at the time of reproduction. Consequently, the reproduction light, which occurs at the time of reproduction, travels at a predetermined angle with respect to the reproduction-specific reference light. This allows the reproduction light and the reproduction-specific reference light to be spatially separated from each other.

Nevertheless, when the information light and the recording-specific reference light are allowed to be incident on the recording medium with a predetermined angle therebetween at the time of recording so as to spatially separate the reproduction light and the reproduction-specific reference light from each other at the time of reproduction as described above, there arises a problem that the optical system for recording and reproduction becomes greater in size.

OBJECT AND SUMMARY OF THE INVENTION

It is an object of the invention to provide an optical information recording apparatus and method, an optical information reproducing apparatus and method, and an optical information recording/reproducing apparatus and method for recording or reproducing information through the use of holography, which allow a small configuration of the optical system for recording or reproduction, and an improved S/N ratio of reproduced information.

An optical information recording apparatus of the invention is an apparatus for recording information on an optical information recording medium having an information recording layer on which information is recorded through the use of holography. The apparatus comprises:

information light generating means for generating information light by spatially modulating a phase of light based on information to be recorded;

recording-specific reference light generating means for generating recording-specific reference light; and a recording optical system for irradiating the information recording layer with the information light generated by the information light generating means and the recording-specific reference light generated by the recording-specific reference light generating means so that the information is recorded on the information recording layer in the form of an interference pattern resulting from interference between the information light and the recording-specific reference light.

According to the optical information recording apparatus of the invention, information is recorded on the information recording layer of the optical information recording medium by using the information light that is spatially modulated in phase based on the information to be recorded, and the recording-specific reference light.

In the optical information recording apparatus of the invention, the recording optical system may perform the irradiation with the information light and the recording-specific reference light on the same side of the information recording layer so that the information light and the recording-specific reference light are arranged coaxially.

In the optical information recording apparatus of the invention, the information light generating means may set the phase of the light after the modulation at either of two values, or any of three or more values.

In the optical information recording apparatus of the invention, the recording-specific reference light generating means may generate the recording-specific reference light that is spatially modulated in phase. In this case, the information light generating means may spatially modulate the phase of the light in accordance with a phase modulation pattern determined based on the information to be recorded and a phase modulation pattern of the recording-specific reference light.

The optical information recording apparatus of the invention may further comprise a flying-type head body that accommodates the information light generating means, the recording-specific reference light generating means and the recording optical system, and flies over the optical information recording medium.

An optical information recording method of the invention is a method for recording information on an optical information recording medium having an information recording layer on which information is recorded through the use of holography. The method comprises:

the step of generating information light by spatially modulating a phase of light based on information to be recorded;

the step of generating recording-specific reference light; and the recording step in which the information recording layer is irradiated with the information light and the recording-specific reference light so that the information is recorded on the information recording layer in the form of an interference pattern resulting from interference between the information light and the recording-specific reference light.

According to the optical information recording method of the invention, information is recorded on the information recording layer of the optical information recording medium by using the information light that is spatially modulated in phase based on the information to be recorded, and the recording-specific reference light.

In the optical information recording method of the invention, in the recording step, the irradiation with the information light and the recording-specific reference light may be performed on the same side of the information recording layer so that the information light and the recording-specific reference light are arranged coaxially.

In the optical information recording method of the invention, in the step of generating the information light, the phase of the light after the modulation may be set at either of two values, or any of three or more values.

In the optical information recording method of the invention, the step of generating the recording-specific reference light may generate the recording-specific reference light that is spatially modulated in phase. In this case, in the step of generating the information light, the phase of the light may be spatially modulated in accordance with a phase modulation pattern determined based on the information to be recorded and a phase modulation pattern of the recording-specific reference light.

An optical information reproducing apparatus of the invention is an apparatus for reproducing information through the use of holography from an optical information recording medium having an information recording layer on which information is recorded in the form of an interference pattern resulting from interference between information light that is spatially modulated in phase based on information to be recorded, and recording-specific reference light. The apparatus comprises:

reproduction-specific reference light generating means for generating reproduction-specific reference light;

a reproducing optical system for irradiating the information recording layer with the reproduction-specific reference light generated by the reproduction-specific reference light generating means, collecting reproduction light that is generated from the information recording layer irradiated with the reproduction-specific reference light, and generating composite light by superimposing the reproduction light on the reproduction-specific reference light; and detecting means for detecting the composite light generated by the reproducing optical system.

According to the optical information reproducing apparatus of the invention, the information recording layer of the optical information recording medium is irradiated with the reproduction-specific reference light, so that the reproduction light is generated from the information recording layer. The reproduction light is light that is spatially modulated in phase according to the information recorded. The reproduction light is superimposed on the reproduction-specific reference light to generate the composite light. The composite light is light that is spatially modulated in intensity according to the information recorded. The information is reproduced by detecting the composite light.

In the optical information reproducing apparatus of the invention, the reproducing optical system may perform the irradiation with the reproduction-specific reference light and the collection of the reproduction light on the same side of the information recording layer so that the reproduction-specific reference light and the reproduction light are arranged coaxially.

In the optical information reproducing apparatus of the invention, the reproduction-specific reference light generating means may generate the reproduction-specific reference light that is spatially modulated in phase.

The optical information reproducing apparatus of the invention may further comprise a flying-type head body that accommodates the reproduction-specific reference light generating means, the reproducing optical system and the detecting means, and flies over the optical information recording medium.

An optical information reproducing method of the invention is a method for reproducing information through the use of holography from an optical information recording medium having an information recording layer on which information is recorded in the form of an interference pattern resulting from interference between information light that is spatially modulated in phase based on information to be recorded, and recording-specific reference light. The method comprises:

the step of generating reproduction-specific reference light;

the reproducing step in which the information recording layer is irradiated with the reproduction-specific reference light, reproduction light that is generated from the information recording layer irradiated with the reproduction-specific reference light is collected, and composite light is generated by superimposing the reproduction light on the reproduction-specific reference light; and the step of detecting the composite light.

According to the optical information reproducing method of the invention, the information recording layer of the optical information recording medium is irradiated with the reproduction-specific reference light, so that the reproduction light is generated from the information recording layer. The reproduction light is light that is spatially modulated in phase according to the information recorded. The reproduction light is superimposed on the reproduction-specific reference light to generate the composite light. The composite light is light that is spatially modulated in intensity according to the information recorded. The information is reproduced by detecting the composite light.

In the optical information reproducing method of the invention, in the reproducing step, the irradiation with the reproduction-specific reference light and the collection of the reproduction light may be performed on the same side of the information recording layer so that the reproduction-specific reference light and the reproduction light are arranged coaxially.

In the optical information reproducing method of the invention, the step of generating the reproduction-specific reference light may generate the reproduction-specific reference light that is spatially modulated in phase.

An optical information recording/reproducing apparatus of the invention is an apparatus for recording information on an optical information recording medium having an information recording layer on which information is recorded through the use of holography, and for reproducing the information from the information recording medium. The apparatus comprises:

information light generating means for generating information light by spatially modulating a phase of light based on information to be recorded;

recording-specific reference light generating means for generating recording-specific reference light;

reproduction-specific reference light generating means for generating reproduction-specific reference light;

a recording/reproducing optical system for irradiating the information recording layer with the information light generated by the information light generating means and the recording-specific reference light generated by the recording-specific reference light generating means when recording information so that the information is recorded on the information recording layer in the form of an interference pattern resulting from interference between the information light and the recording-specific reference light, and irradiating the information recording layer with the reproduction-specific reference light generated by the reproduction-specific reference light generating means, collecting reproduction light that is generated from the information recording layer irradiated with the reproduction-specific reference light, and generating composite light by superimposing the reproduction light on the reproduction-specific reference light when reproducing information; and detecting means for detecting the composite light generated by the recording/reproducing optical system.

According to the optical information recording/reproducing apparatus of the invention, in information recording, information is recorded on the information recording layer of the optical information recording medium by using the information light that is spatially modulated in phase based on the information to be recorded, and the recording-specific reference light. In information reproduction, the information recording layer of the optical information recording medium is irradiated with the reproduction-specific reference light, so that the reproduction light is generated from the information recording layer. The reproduction light is light that is spatially modulated in phase according to the information recorded. The reproduction light is superimposed on the reproduction-specific reference light to generate the composite light. The composite light is light that is spatially modulated in intensity according to the information recorded. Information is reproduced by detecting the composite light.

In the optical information recording/reproducing apparatus of the invention, the recording/reproducing optical system may perform the irradiation with the information light, the recording-specific reference light and the reproduction-specific reference light and the collection of the reproduction light on the same side of the information recording layer so that the information light, the recording-specific reference light, the reproduction-specific reference light and the reproduction light are arranged coaxially. In this case, the information light generating means, the recording-specific reference light generating means, and the reproduction-specific reference light generating means may respectively generate the information light, the recording-specific reference light, and the reproduction-specific reference light that are linearly polarized in the same direction; and the recording/reproducing optical system may have: a quarter-wave plate for converting the information light and the recording-specific reference light from first linearly polarized light to circularly polarized light to irradiate the information recording layer with the same, and converting the reproduction light generated from the information recording layer from circularly polarized light to second linearly polarized light whose direction of polarization is orthogonal to that of the first linearly polarized light; and a polarization separation optical element for achieving separation between an optical path of the information light, the recording-specific reference light, and the reproduction-specific reference light yet to pass through the quarter-wave plate and an optical path of return light from the optical information recording medium that has passed through the quarter-wave plate, according to a difference in directions of polarization.

In the optical information recording/reproducing apparatus of the invention, the recording-specific reference light generating means may generate the recording-specific reference light that is spatially modulated in phase, and the reproduction-specific reference light generating means may generate the reproduction-specific reference light that is spatially modulated in phase. In this case, the information light generating means may spatially modulate the phase of the light in accordance with a phase modulation pattern determined based on the information to be recorded and a phase modulation pattern of the recording-specific reference light.

The optical information recording/reproducing apparatus of the invention may further comprise a flying-type head body that accommodates the information light generating means, the recording-specific reference light generating means, the reproduction-specific reference light generating means, the recording/reproducing optical system and the detecting means, and flies over the optical information recording medium.

An optical information recording/reproducing method of the invention is a method for recording information on an optical information recording medium having an information recording layer on which information is recorded through the use of holography, and for reproducing the information from the information recording medium. The method comprises:

the step of generating information light by spatially modulating a phase of light based on information to be recorded;

the step of generating recording-specific reference light;

the recording step in which the information recording layer is irradiated with the information light and the recording-specific reference light so that the information is recorded on the information recording layer in the form of an interference pattern resulting from interference between the information light and the recording-specific reference light;

the step of generating reproduction-specific reference light;

the reproducing step in which the information recording layer is irradiated with the reproduction-specific reference light, reproduction light that is generated from the information recording layer irradiated with the reproduction-specific reference light is collected, and composite light is generated by superimposing the reproduction light on the reproduction-specific reference light; and the step of detecting the composite light.

According the optical information recording/reproducing method of the invention, in information recording, information is recorded on the information recording layer of the optical information recording medium by using the information light that is spatially modulated in phase based on the information to be recorded, and the recording-specific reference light. In information reproduction, the information recording layer of the optical information recording medium is irradiated with the reproduction-specific reference light, so that the reproduction light is generated from the information recording layer. The reproduction light is light that is spatially modulated in phase according to the information recorded. The reproduction light is superimposed on the reproduction-specific reference light to generate the composite light. The composite light is light that is spatially modulated in intensity according to the information recorded. Information is reproduced by detecting the composite light.

In the optical information recording/reproducing method of the invention, the irradiation with the information light, the recording-specific reference light and the reproduction-specific reference light and the collection of the reproduction light may be performed on the same side of the information recording layer so that the information light, the recording-specific reference light, the reproduction-specific reference light and the reproduction light are arranged coaxially.

In the optical information recording/reproducing method of the invention, the step of generating the recording-specific reference light may generate the recording-specific reference light that is spatially modulated in phase, and the step of generating the reproduction-specific reference light may generate the reproduction-specific reference light that is spatially modulated in phase. In this case, in the step of generating the information light, the phase of the light may be spatially modulated in accordance with a phase modulation pattern determined based on the information to be recorded and a phase modulation pattern of the recording-specific reference light.

Other objects, features and advantages of the invention will become sufficiently clear from the following description.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts.

DETAILED DESCRIPTION OF CERTAIN PREFERRED EMBODIMENTS OF THE INVENTION

Hereinafter, embodiments of the invention will be described in detail with reference to the drawings.

[First Embodiment]

Figure 1:
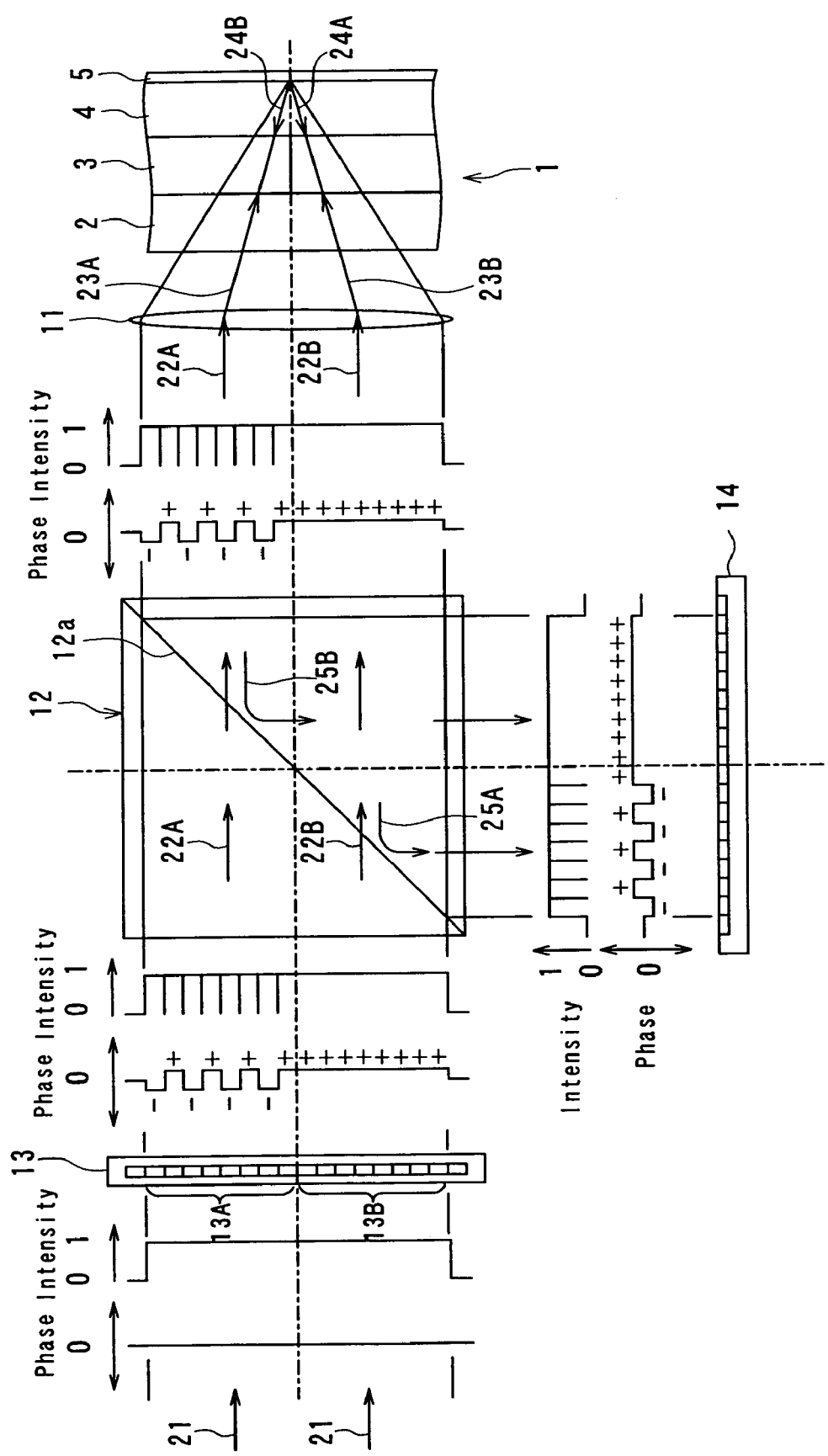
FIG. 1 is an explanatory diagram showing the principle of information recording in an optical information recording/reproducing apparatus according to a first embodiment of the invention.

FIG. 1 is an explanatory diagram showing the principle of information recording in an optical information recording/reproducing apparatus according to a first embodiment of the invention.

Initially, with reference to FIG. 1, description will be given of the configuration of an optical information recording medium for use in the present embodiment. An optical information recording medium 1 of the present embodiment comprises a disk-like transparent substrate 2 made of polycarbonate or the like, and an information recording layer 3, an air gap layer 4, and a reflecting film 5 that are arranged in this order from the transparent substrate 2, on a side of the transparent substrate 2 opposite from the light incident/emergent side. The information recording layer 3 is a layer on which information is recorded through the use of holography, and is made of a hologram material which varies, when irradiated with light, in its optical characteristics such as refractive index, permittivity, and reflectance, depending on the intensity of the light. The available hologram material includes photopolymer HRF-600 (product name) manufactured by Dupont and photopolymer ULSH-500 (product name) manufactured by Aprils. The reflecting film 5 is made of aluminum, for example. Incidentally, in the optical information recording medium 1, the information recording layer 3 and the reflecting film 5 may be arranged next to each other without the air gap layer 4.

Next, description will be given of the principle of information recording in the optical information recording/reproducing apparatus according to the embodiment, i.e., the optical information recording method according to the embodiment. In the embodiment, information light and recording-specific reference light are generated, and the information recording layer 3 of the optical information recording medium 1 is irradiated with the information light and the recording-specific reference light so that information is recorded in the information recording layer 3 in the form of an interference pattern resulting from interference between the information light and the recording-specific reference light. The information light is generated by spatially modulating the phase of light based on the information to be recorded.

Hereinafter, the optical information recording method according to the embodiment will be described in detail with reference to FIG. 1. FIG. 1 illustrates part of an example of the recording/reproducing optical system in the optical information recording/reproducing apparatus according to the embodiment. In this example, the recording/reproducing optical system has an objective lens 11 facing toward the transparent-substrate-2 side of the optical information recording medium 1, and a beam splitter 12 and a phase spatial light modulator 13 that are arranged in this order from the objective lens 11, on a side of the objective lens 11 opposite from the optical information recording medium 1. The beam splitter 12 has a semi-reflecting surface 12a that is inclined at 45° in the normal direction with respect to the direction of the optical axis of the objective lens 11. The recording/reproducing optical system shown in FIG. 1 also has a photodetector 14. The photodetector 14 is provided in a direction in which return light from the optical information recording medium 1 is reflected by the semi-reflecting surface 12a of the beam splitter 12. The phase spatial light modulator 13 has a number of pixels arranged in a matrix, and is capable of spatially modulating the phase of light by selecting the phase of emergent light pixel by pixel. The photodetector 14 also has a number of pixels arranged in a matrix, and is capable of detecting the intensity of received light pixel by pixel.

In the example shown in FIG. 1, the phase spatial light modulator 13 generates the information light and the recording-specific reference light. Coherent parallel light having a constant phase and intensity is incident on the phase spatial light modulator 13. For information recording, the phase spatial light modulator 13, in a half area 13A thereof, selects the phase of the emergent light pixel by pixel based on the information to be recorded, thereby modulating the phase of the light spatially to generate the information light. In the other half area 13B, it renders the phase of the emergent light identical for all the pixels to generate the recording-specific reference light.

In the area 13A, the phase spatial light modulator 13 sets the phase of the light after the modulation pixel by pixel, to either a first phase having a phase difference of $+\pi/2$ (rad) with respect to a predetermined reference phase, or a second phase having a phase difference of $-\pi/2$ (rad) with respect to the reference phase. The phase difference between the first phase and the second phase is $\pi$ (rad). Incidentally, in the area 13A, the phase spatial light modulator 13 may set the phase of the light after the modulation at any of three or more values pixel by pixel. In the area 13B, the phase spatial light modulator 13 sets the phase of the emergent light for every pixel to the first phase having a phase difference of $+\pi/2$ (rad) with respect to the predetermined reference phase. Incidentally, in the area 13B, the phase spatial light modulator 13 may set the phase of the emergent light for every pixel to the second phase or a certain phase different from both the first phase and the second phase.

FIG. 1 shows the phases and intensities of the incident light on the phase spatial light modulator 13, the emergent light from the phase spatial light modulator 13, the incident light on the objective lens 11 yet to irradiate the optical information recording medium 1 with, and the return light from the optical information recording medium 1 reflected by the semi-reflecting surface 12a of the beam splitter 12. In FIG. 1, the symbol "+" represents the first phase, and the symbol "−" the second phase. FIG. 1 also shows the maximum value of intensity as "1" and the minimum value of intensity as "0".

In the example shown in FIG. 1, for information recording, coherent parallel light 21 having a constant phase and intensity is incident on the phase spatial light modulator 13. Of the light incident on the phase spatial light modulator 13, the light that has passed through the area 13A becomes information light 22A, being spatially modulated in phase based on the information to be recorded. Incidentally, the information light 22A locally drops in intensity at the borders between first-phase pixels and second-phase pixels. Meanwhile, of the light incident on the phase spatial light modulator 13, the light that has passed through the area 13B becomes recording-specific reference light 22B without being spatially modulated in phase. The information light 22A and the recording-specific reference light 22B are incident on the beam splitter 12. Part of them passes through the semi-reflecting surface 12a, and further through the objective lens 11 to turn into converging information light 23A and converging recording-specific reference light 23B, respectively, with which the optical information recording medium 1 is irradiated. The information light 23A and the recording-specific reference light 23B pass through the information recording layer 3, converge to a minimum diameter on the interface between the air gap layer 4 and the reflecting film 5, and are reflected by the reflecting film 5. Information light 24A and recording-specific reference light 24B that have been reflected by the reflecting film 5 become divergent light to pass through the information recording layer 3 again.

In the information recording layer 3, the information light 23A yet to be reflected by the reflecting film 5 and the recording-specific reference light 24B that has been reflected by the reflecting film 5 interfere with each other to form an interference pattern, and the information light 24A that has been reflected by the reflecting film 5 and the recording-specific reference light 23B yet to be reflected by the reflecting film 5 interfere with each other to form an interference pattern. Then, these interference patterns are volumetrically recorded in the information recording layer 3.

The information light 24A and the recording-specific reference light 24B having been reflected by the reflecting film 5 are emitted from the optical information recording medium 1, and become parallel information light 25A and parallel recording-specific reference light 25B through the objective lens 11. The light 25A and the light 25B are incident on the beam splitter 12, and part of each of them is reflected by the semi-reflecting surface 12a and received by the photodetector 14.

Next, description will be given of the principle of information reproduction in the optical information recording/reproducing apparatus according to the embodiment, i.e., the optical information reproducing method according to the embodiment. In the embodiment, reproduction-specific reference light is generated, and the information recording layer 3 of the optical information recording medium 1 is irradiated with this reproduction-specific reference light. Then, reproduction light that is generated from the information recording layer 3 irradiated with the reproduction-specific reference light is collected. The reproduction light is superimposed on the reproduction-specific reference light to generate composite light, and this composite light is detected.

Figure 2:
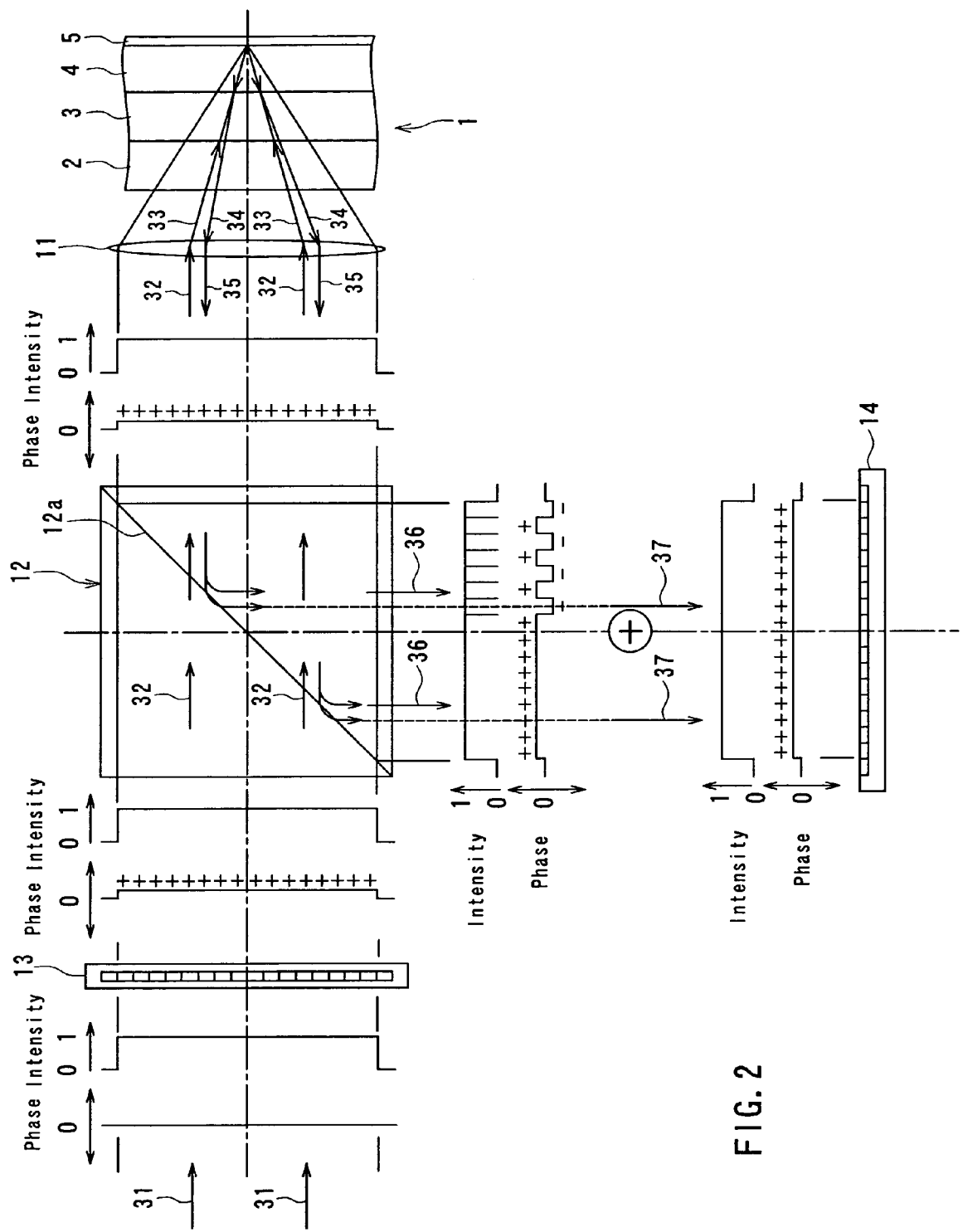
FIG. 2 is an explanatory diagram showing the principle of information reproduction in the optical information recording/reproducing apparatus according to the first embodiment of the invention.

Hereinafter, the optical information reproducing method according to the embodiment will be described in detail with reference to FIG. 2. FIG. 2 is an explanatory diagram showing the principle of information reproduction in the optical information recording/reproducing apparatus according to the embodiment. Like FIG. 1, FIG. 2 illustrates part of an example of the recording/reproducing optical system in the optical information recording/reproducing apparatus according to the embodiment.

FIG. 2 shows the phases and intensities of the incident light on the phase spatial light modulator 13, the emergent light from the phase spatial light modulator 13, the incident light on the objective lens 11 yet to irradiate the optical information recording medium 1 with, and the return light from the optical information recording medium 1 reflected by the semi-reflecting surface 12a of the beam splitter 12. The phases and intensities are expressed in the same manner as in FIG. 1.

In the example shown in FIG. 2, for information reproduction, coherent parallel light 31 having a constant phase and intensity is incident on the phase spatial light modulator 13. For information reproduction, the phase spatial light modulator 13 sets the phase of the emergent light for every pixel to a first phase having a phase difference of $+\pi/2$ (rad) with respect to a predetermined reference phase, thereby generating reproduction-specific reference light 32. The reproduction-specific reference light 32 is incident on the beam splitter 12, and part thereof passes through the semi-reflecting surface 12a, and further through the objective lens 11 to turn into converging reproduction-specific reference light 33, with which the optical information recording medium 1 is irradiated. The reproduction-specific reference light 33 passes through the information recording layer 3, converges to a minimum diameter on the interface between the air gap layer 4 and the reflecting film 5, and is reflected by the reflecting film 5. Having been reflected by the reflecting film 5, the reproduction-specific reference light becomes divergent light to pass through the information recording layer 3 again.

In the information recording layer 3, the reproduction-specific reference light 33 yet to be reflected by the reflecting film 5 causes reproduction light that travels away from the reflecting film 5. The reproduction-specific reference light that has been reflected by the reflecting film 5 causes reproduction light that travels toward the reflecting film 5. The reproduction light traveling away from the reflecting film 5 is emitted as-is from the optical information recording medium 1. The reproduction light traveling toward the reflecting film 5 is reflected by the reflecting film 5 and emitted from the optical information recording medium 1.

Thus, at the time of reproduction, return light 34 from the optical information recording medium 1 includes the reproduction light and the reproduction-specific reference light that has been reflected by the reflecting film 5. The return light 34 is turned into parallel return light 35 through the objective lens 11, and incident on the beam splitter 12. Part of the light is reflected by the semi-reflecting surface 12a, and received by the photodetector 14. The return light 35 incident on the photodetector 14 includes reproduction light 36 and reproduction-specific reference light 37 that has been reflected by the reflecting film 5. The reproduction light 36 is light that is spatially modulated in phase according to the information recorded in the information recording layer 3. For the sake of convenience, FIG. 2 shows the reproduction light 36 and the reproduction-specific reference light 37 separately, along with their respective phases and intensities. In reality, however, the reproduction light 36 is superimposed on the reproduction-specific reference light 37 to generate composite light, and this composite light is received by the photodetector 14. The composite light is light that is spatially modulated in intensity according to the information recorded. Thus, the photodetector 14 detects a two-dimensional intensity pattern of the composite light, from which the information is reproduced.

As shown in FIG. 1 and FIG. 2, the optical information recording/reproducing apparatus according to the embodiment performs the irradiation with the information light, the recording-specific reference light and the reproduction-specific reference light and the collection of the reproduction light on the same side of the information recording layer 3 so that the information light, the recording-specific reference light, the reproduction-specific reference light and the reproduction light are arranged coaxially. In FIG. 1, the information light 23A and the recording-specific reference light 23B to irradiate the information recording layer 3 with are light beams that are semicircular in cross section. Those beams are coaxial since they constitute respective halves of a light beam that is circular in cross section.

Figure 3:
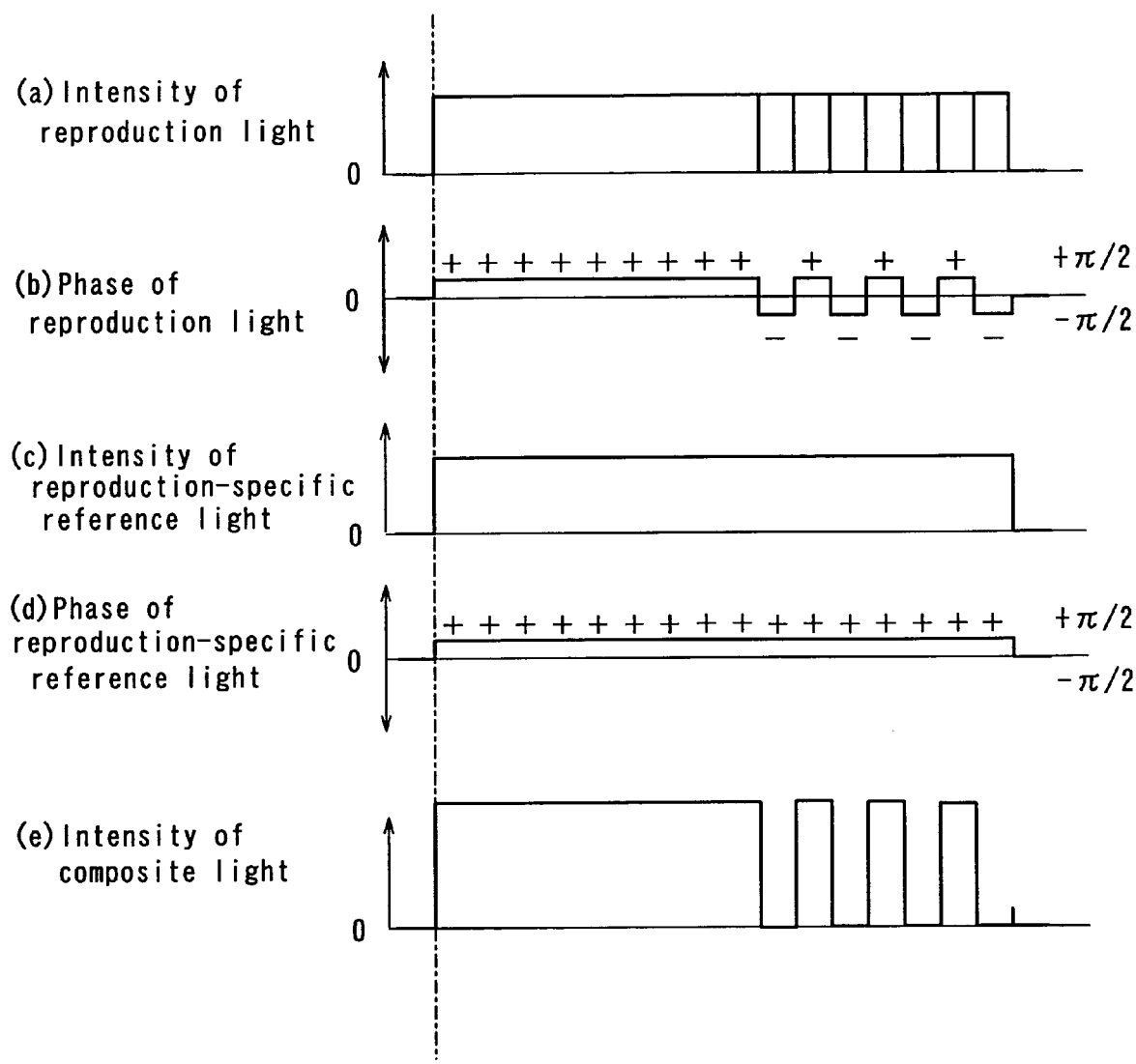
FIG. 3 is a waveform diagram for explaining in detail the principle of information reproduction in the optical information recording/reproducing apparatus according to the first embodiment of the invention.

Now, reference is made to FIG. 3 to describe in detail the reproduction light 36, the reproduction-specific reference light 37, and the composite light mentioned above. In FIG. 3, (a) represents the intensity of the reproduction light 36, (b) the phase of the reproduction light 36, (c) the intensity of the reproduction-specific reference light 37, (d) the phase of the reproduction-specific reference light 37, and (e) the intensity of the composite light. FIG. 3 shows an example where the phase of the information light for each pixel is set to either the first phase having a phase difference of $+\pi/2$ (rad) with respect to the reference phase, or the second phase having a phase difference of $-\pi/2$ (rad) with respect to the reference phase. Consequently, in the example shown in FIG. 3, the reproduction light 36 has either the first phase or the second phase pixel by pixel as the information light does. The reproduction-specific reference light 37 has the first phase for every pixel. Assuming here that the reproduction light 36 and the reproduction-specific reference light 37 are equal in intensity, the composite light exceeds the reproduction light 36 and the reproduction-specific reference light 37 in intensity at pixels where the reproduction light 36 has the first phase, and the composite light theoretically becomes zero in intensity at pixels where the reproduction light 36 has the second phase, as shown in FIG. 3(e).

Next, description will be given in detail of the relationship between the phase of the reproduction light and the intensity of the composite light, including situations where the phase of the information light is set at either of two values and where the phase of the information light is set at any of three or more values for recording.

The composite light is made by superimposing one of two lightwaves, the reproduction light, on the other, the reproduction-specific reference light. Thus, the intensity I of the composite light is given by the following equation (1), where $a_0$ is both the amplitude of the reproduction light and the amplitude of the reproduction-specific reference light, and $\delta$ is a phase difference between the reproduction light and the reproduction-specific reference light:

$$I = 2a_0^2 + 2a_0^2\cos\delta \quad (1)$$
$$= 2a_0^2(1 + \cos\delta)$$
$$= 4a_0^2\cos^2(\delta/2).$$

Since the phase of the reproduction-specific reference light is constant irrespective of pixel, from the foregoing equation, it can be seen that the intensity I of the composite light varies with the phase of the reproduction light. Moreover, when the phase of the information light is set at any of n values (n is an integer no less than 2) within a range of, e.g., $+\pi/2$ (rad) to $-\pi/2$ (rad), the intensity I of the composite light also takes any of the n values.

As above, according to the optical information reproducing method of the embodiment, the two-dimensional intensity pattern of the composite light generated by superimposing the reproduction light on the reproduction-specific reference light is detected to reproduce the information recorded in the information recording layer 3 in the form of an interference pattern resulting from the interference between the information light that is spatially modulated in phase based on the information to be recorded, and the recording-specific reference light.

Next, description will be given of a configuration of the optical information recording/reproducing apparatus according to the embodiment. The optical information recording/reproducing apparatus according to the embodiment includes the optical information recording apparatus according to the embodiment and the optical information reproducing apparatus according to the embodiment.

Figure 4:
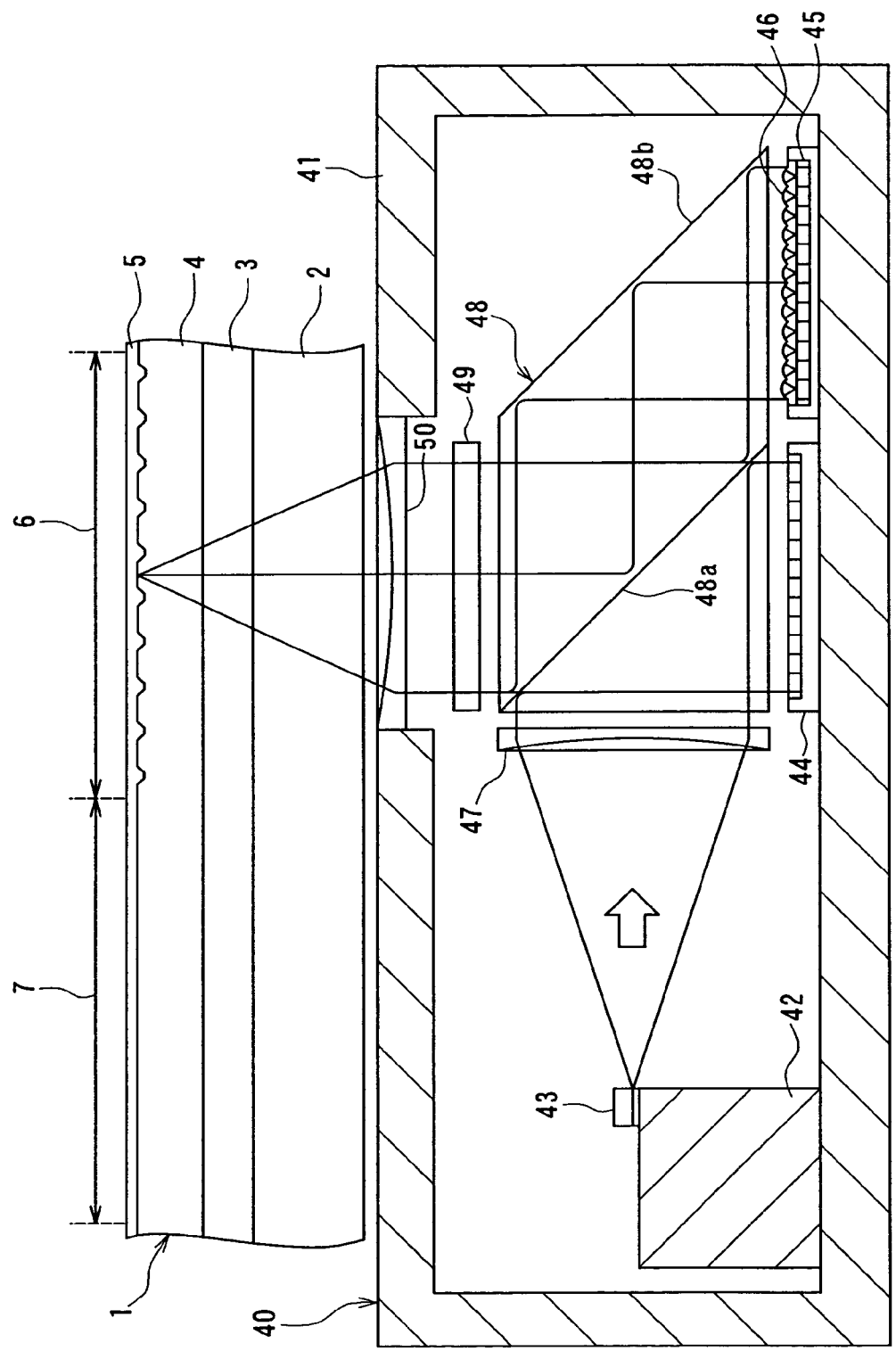
FIG. 4 is a cross-sectional view showing an optical head of the optical information recording/reproducing apparatus according to the first embodiment of the invention.

FIG. 4 is a cross-sectional view showing an optical head of the optical information recording/reproducing apparatus according to the embodiment. As shown in FIG. 4, the embodiment uses an optical information recording medium 1 that has positioning information. That is, as shown in FIG. 4, the optical information recording medium 1 of the embodiment has a plurality of address servo areas 6 linearly extending in a radial direction. The address servo areas 6 are arranged at predetermined angular intervals on the interface between the air gap layer 4 and the reflecting film 5. The fan-shaped sections between adjoining address servo areas 6 make data areas 7. The address servo areas 6 contain information for performing tracking servo by a sampled servo system and address information, both of which are recorded in advance in the form of emboss pits or the like. As will be described later, no focus servo is performed in the present embodiment.

As shown in FIG. 4, the optical information recording/reproducing apparatus according to the embodiment is provided with an optical head 40 that is placed to face toward the transparent substrate 2 of the optical information recording medium 1. The optical head 40 has a flying-type head body 41 that accommodates individual components to be described later and flies over the optical information recording medium 1. A semiconductor laser 43 is fixed to the internal bottom of the head body 41 via a support 42. A phase spatial light modulator 44 of reflection type and a photodetector 45 are also fixed thereto. A micro lens array 46 is attached to the light-receiving surface of the photodetector 45. In the head body 41, a prism block 48 is provided above the phase spatial light modulator 44 and the photodetector 45. A collimator lens 47 is provided near an end of the prism block 48 closer to the semiconductor laser 43. The head body 41 has an opening in the surface facing toward the optical information recording medium 1. An objective lens 50 is provided in this opening. A quarter-wave plate 49 is provided between the objective lens 50 and the prism block 48.

The phase spatial light modulator 44 has a number of pixels arranged in a matrix, and is capable of spatially modulating the phase of light by setting the phase of emergent light pixel by pixel to either of two values differing by $\pi$ (rad) from each other. Furthermore, the phase spatial light modulator 44 rotates the direction of polarization of the emergent light by 90° with respect to the direction of polarization of the incident light.

The photodetector 45 has a number of pixels arranged in a matrix, and is capable of detecting the intensity of received light pixel by pixel. The microlens array 46 includes a plurality of microlenses arranged to oppose to the light-receiving surfaces of the respective pixels of the photodetector 45.

A CCD-type solid image pick-up device or a MOS-type solid image pick-up device may be used as the photodetector 45. Alternatively, a smart light sensor in which a MOS type solid image pick-up device and a signal processing circuit are integrated on a single chip (for example, see the literature "O plus E, September 1996, No. 202, pp. 93–99") maybe used. Since this smart light sensor has a high transfer rate and high-speed operation facilities, the use of this smart light sensor allows high-speed reproduction. For example, reproduction can be performed at transfer rates on the order of Gbit/s.

The prism block 48 has a polarization beam splitter surface 48a and a reflecting surface 48b. Of the polarization beam splitter surface 48a and the reflecting surface 48b, the polarization beam splitter surface 48a is located closer to the collimator lens 47. The polarization beam splitter surface 48a and the reflecting surface 48b are both inclined at 45° in the normal direction with respect to the direction of the optical axis of the collimator lens 47, and they are arranged in parallel to each other.

The phase spatial light modulator 44 is placed below the polarization beam splitter surface 48a, and the photodetector 45 is placed below the reflecting surface 48b. The quarter-wave plate 49 and the objective lens 50 are placed above the polarization beam splitter surface 48a. The collimator lens 47 and the objective lens 50 may be hologram lenses.

The prism block 48 corresponds to the polarization separation optical element of the invention. That is, the polarization beam splitter surface 48a of the prism block 48, as will be detailed later, achieves separation between the optical path of the information light, the recording-specific reference light, and the reproduction-specific reference light yet to pass through the quarter-wave plate 49 and the optical path of the return light from the optical information recording medium 1 having passed through the quarter-wave plate 49, according to the difference in directions of polarization.

Figure 5:
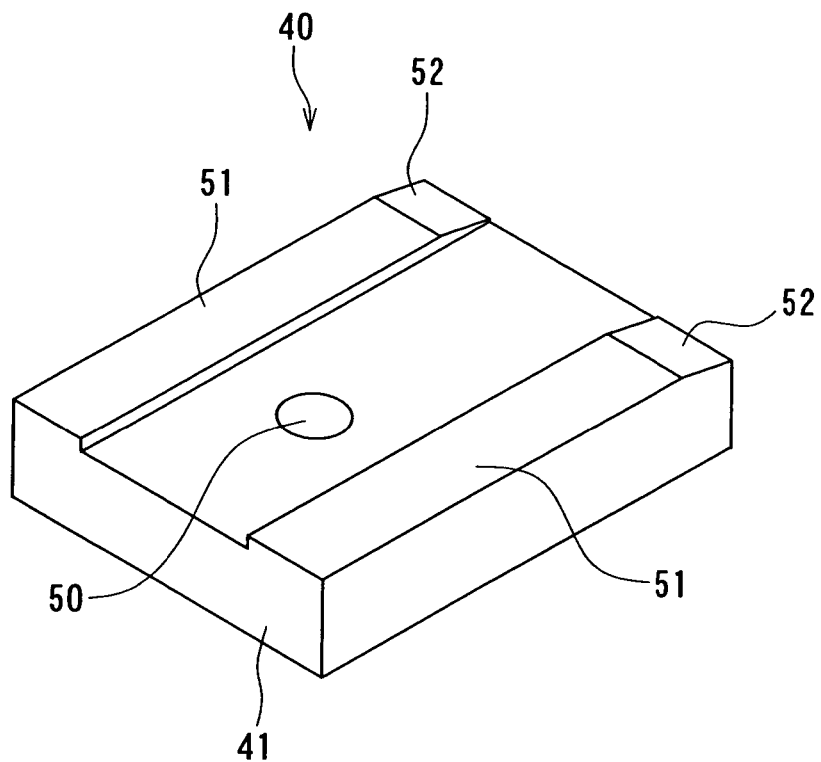
FIG. 5 is a perspective view showing the optical head of the optical information recording/reproducing apparatus according to the first embodiment of the invention.

FIG. 5 is a perspective view showing the optical head of the optical information recording/reproducing apparatus according to the embodiment. As shown in FIG. 5, the flying-type head body 41 has two rail portions 51 that are provided to protrude from the surface that faces toward the optical information recording medium 1. The surfaces of the rail portions 51 closer to the optical information recording medium 1 make an air bearing surface. Tapered portions 52 are provided near the ends of the rail portions 51 on the air inflow side. The tapered portions 52 are shaped to draw apart from the optical information recording medium 1 toward the ends of those portions. By means of the air that flows in from the tapered portions 52, the head body 41 flies over the optical information recording medium 1 with a small gap between the air bearing surface and the optical information recording medium 1. The objective lens 50 is placed between the two rail portions 51. While the head body 41 is flying, the gap between the air bearing surface and the optical information recording medium 1 is on the order of 0.05 μm and is stable. Consequently, in the optical head 40 of the embodiment, an almost constant distance is maintained between the objective lens 50 and the optical information recording medium 1 while the head body 41 is flying, and this eliminates the need for focus servo.

Figure 6:
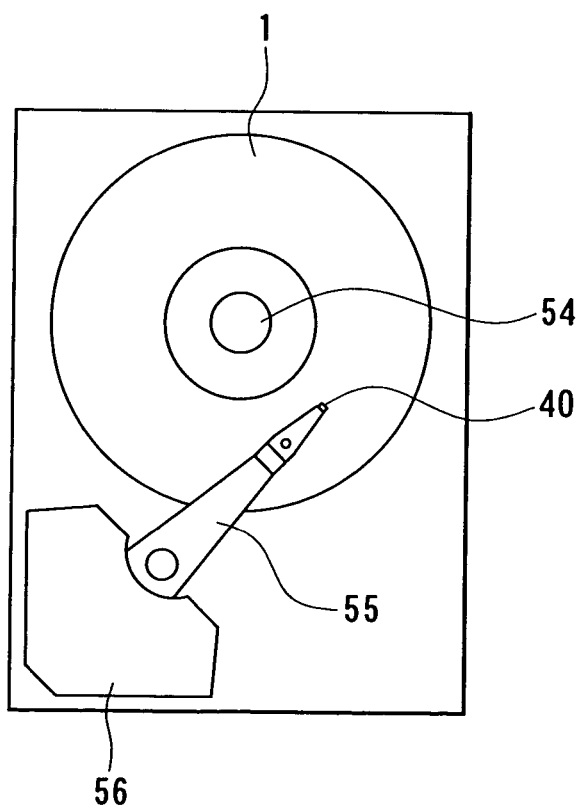
FIG. 6 is a plan view showing the appearance of the optical information recording/reproducing apparatus according to the first embodiment of the invention.

FIG. 6 is a plan view showing the appearance of the optical information recording/reproducing apparatus according to the embodiment. As shown in FIG. 6, the optical information recording/reproducing apparatus is provided with a spindle 54 to which the optical information recording medium 1 is attached, and a spindle motor, which is not shown, for rotating the spindle 54. The optical information recording/reproducing apparatus is further provided with a carriage 55 whose extremity moves in a direction across the track of the optical information recording medium 1, and a voice coil motor 56 for driving the carriage 55. The optical head 40 is attached to the extremity of the carriage 55. In the optical information recording/reproducing apparatus, the carriage 55 and the voice coil motor 56 move the optical head 40 in a direction across the track of the optical information recording medium 1, thereby effecting a track change and tracking servo.

Next, description will be given of the operation of the optical head 40 in information recording. The semiconductor laser 43 emits coherent S-polarized light. Incidentally, S-polarization refers to linear polarization the direction of which is perpendicular to the incidence plane (plane of FIG. 4), whereas P-polarization to be described later refers to linear polarization the direction of which is parallel to the incidence plane.

The S-polarized laser light emitted from the semiconductor laser 43 is turned into parallel light through the collimator lens 47, incident on the polarization beam splitter surface 48a of the prism block 48, reflected from the polarization beam splitter surface 48a, and incident on the phase spatial light modulator 44. In a half area, the emergent light from the phase spatial light modulator 44 becomes the information light that is spatially modulated in phase based on the information to be recorded. In the other half area, the emergent light becomes the recording-specific reference light having an identical phase for all the pixels. The emergent light from the phase spatial light modulator 44 is subjected to a rotation of the direction of polarization by 90° to become P-polarized light.

Since the information light and the recording-specific reference light, which are the emergent light from the phase spatial light modulator 44, are P-polarized, they are transmitted through the polarization beam splitter surface 48a of the prism block 48 and circularly polarized through the quarter-wave plate 49. The information light and the recording-specific reference light are condensed by the objective lens 50 to irradiate the optical information recording medium 1 with. The information light and the recording-specific reference light pass through the information recording layer 3, converge to a minimum diameter on the interface between the air gap layer 4 and the reflecting film 5, and are reflected by the reflecting film 5. Having been reflected by the reflecting film 5, the information light and the recording-specific reference light become divergent light to pass through the information recording layer 3 again. When the output of the semiconductor laser 43 is set at a high output for recording, an interference pattern resulting from the interference between the information light and the recording-specific reference light is recorded on the information recording layer 3 as has been described with reference to FIG. 1.

The return light from the optical information recording medium 1 is turned into parallel light through the objective lens 50, and S-polarized through the quarter-wave plate 49. This return light is reflected by the polarization beam splitter surface 48a of the prism block 48, further reflected by the reflecting surface 48b, and incident on the photodetector 45 through the microlens array 46.

When recording information, while the light beam from the objective lens 50 passes through the address servo areas 6 of the optical information recording medium 1, the output of the semiconductor laser 43 is set at a low output for reproduction and the phase spatial light modulator 44 emits light having an identical phase for all the pixels, without modulating the phase of the light. Address information and tracking error information can be obtained based on the output of the photodetector 45 at this time.

Next, description will be given of the operation of the optical head 40 in information reproduction. In information reproduction, the output of the semiconductor laser 43 is set at a low output for reproduction. The S-polarized laser light emitted from the semiconductor laser 43 is turned into parallel light through the collimator lens 47, incident on the polarization beam splitter surface 48a of the prism block 48, reflected from the polarization beam splitter surface 48a, and incident on the phase spatial light modulator 44. The emergent light from the phase spatial light modulator 44 becomes the reproduction-specific reference light having an identical phase for all the pixels. The emergent light from the phase spatial light modulator 44 is subjected to a rotation of the direction of polarization by 90° to become P-polarized light.

Since the reproduction-specific reference light, which is the emergent light from the phase spatial light modulator 44, is P-polarized, it is transmitted through the polarization beam splitter surface 48a of the prism block 48 and circularly polarized through the quarter-wave plate 49. The reproduction-specific reference light is condensed by the objective lens 50 to irradiate the optical information recording medium 1 with. The reproduction-specific reference light passes through the information recording layer 3, converges to a minimum diameter on the interface between the air gap layer 4 and the reflecting film 5, and is reflected by the reflecting film 5. Having been reflected by the reflecting film 5, the reproduction-specific reference light becomes divergent light to pass through the information recording layer 3 again. As has been described with reference to FIG. 2, the reproduction-specific reference light causes reproduction light to be generated from the information recording layer 3.

The return light from the optical information recording medium 1 includes the reproduction light and the reproduction-specific reference light. The return light is turned into parallel light through the objective lens 50, and S-polarized through the quarter-wave plate 49. The return light is reflected by the polarization beam splitter surface 48a of the prism block 48, further reflected by the reflecting surface 48b, and incident on the photodetector 45 through the microlens array 46. The information recorded on the optical information recording medium 1 can be reproduced based on the output of the photodetector 45.

When reproducing information, while the light beam from the objective lens 50 passes through the address servo areas 6 of the optical information recording medium 1, address information and tracking error information can be obtained based on the output of the photodetector 45.

Figure 7:
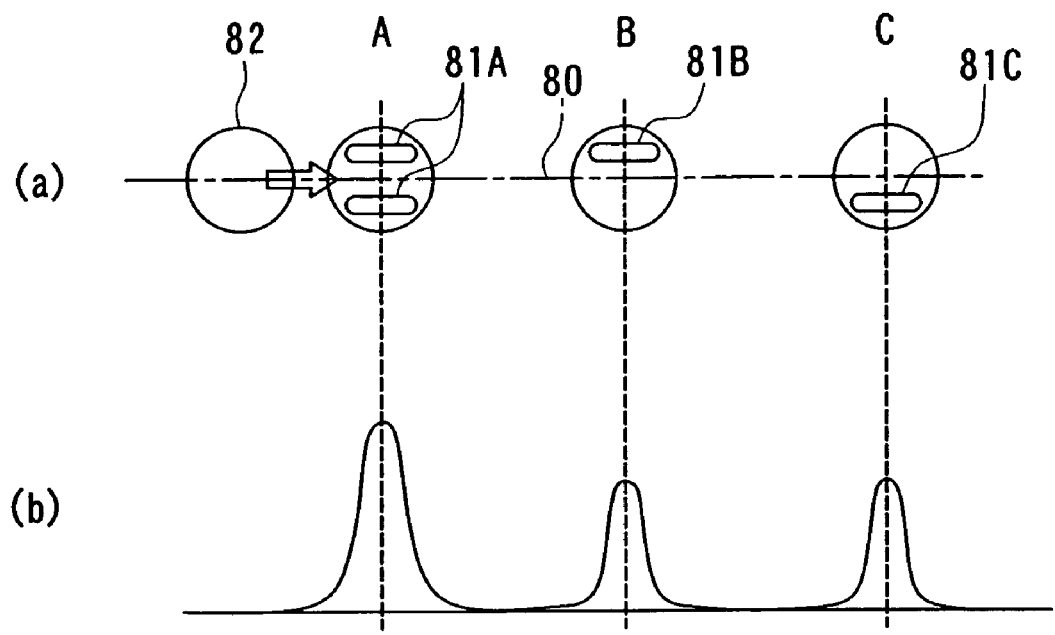
FIG. 7 is an explanatory diagram for explaining an example of a method for producing tracking error information and a method for tracking servo in the first embodiment of the invention.
Figure 8:
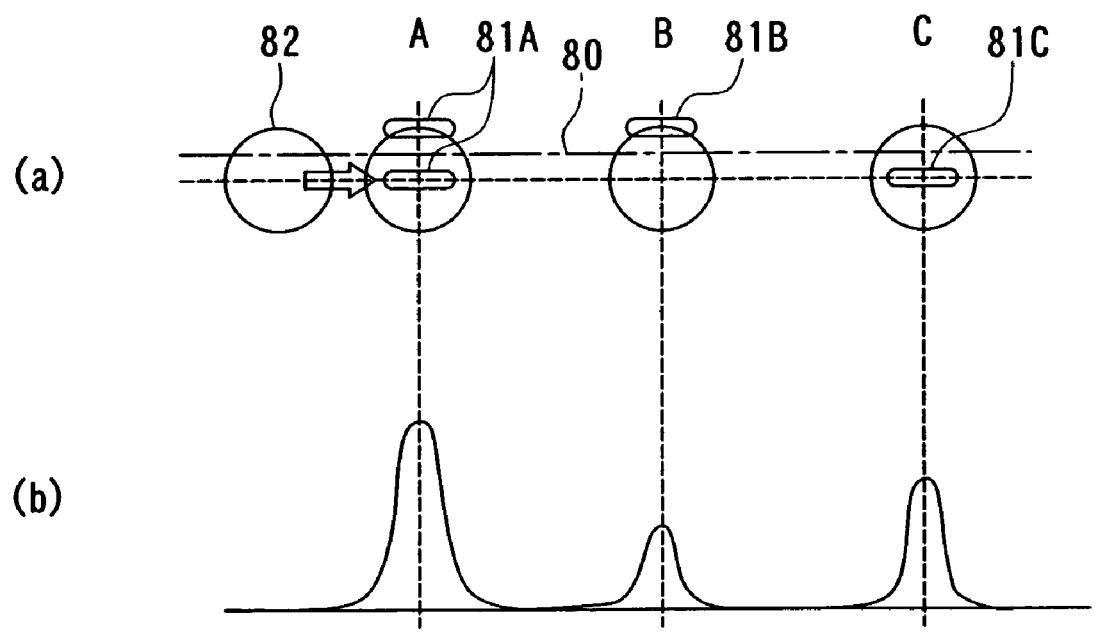
FIG. 8 is an explanatory diagram for explaining an example of the method for producing tracking error information and the method for tracking servo in the first embodiment of the invention.

Next, with reference to FIG. 7 and FIG. 8, description will be given of an example of a method for producing tracking error information and a method for tracking servo according to the embodiment. In this example, as shown in FIG. 7(a), the address servo areas 6 of the optical information recording medium 1 have two pits 81A, a single pit 81B, and a single pit 81C that are formed in this order in a traveling direction of a light beam 82 along a track 80, as positioning information to be used for tracking servo. The two pits 81A are arranged at a position designated by the symbol A in FIG. 7, symmetrically across the track 80. The pit 81B is located at a position designated by the symbol B in FIG. 7, being shifted to one side with respect to the track 80. The pit 81C is located at a position designated by the symbol C in FIG. 7, being shifted to the side opposite from the pit 81B, with respect to the track 80.

As shown in FIG. 7(a), in the case where the light beam 82 travels on the track 80 accurately, the respective total amounts of light received by the photodetector 45 at the time when the light beam 82 passes through the positions A, B, and C are as shown in FIG. 7(b). That is, the amount of light received is greatest at the time of passing through the position A, and the amounts of light received at the time of passing through the position B and at the time of passing through the position C are the same, which are lower than the amount at the time of passing through the position A.

On the other hand, as shown in FIG. 8(a), in the case where the light beam 82 travels off the track 80 with a deviation toward the pit 81C, the respective total amounts of light received by the photodetector 45 at the time when the light beam 82 passes through the positions A, B, and C are as shown in FIG. 8(b). That is, the amount of light received is greatest at the time of passing through the position A, second greatest at the time of passing through the position C, and smallest at the time of passing through the position B. The absolute value of difference between the amounts of light received at the time of passing through the position B and at the time of passing through the position C increases with increasing amount of deviation of the light beam 82 from the track 80.

Although not shown, when the light beam 82 travels off the track 80 with a deviation toward the pit 81B, the amount of light received is greatest at the time of passing through the position A, second greatest at the time of passing through the position B, and smallest at the time of passing through the position C. The absolute value of difference between the amounts of light received at the time of passing through the position B and at the time of passing through the position C increases with increasing amount of deviation of the light beam 82 from the track 80.

From the foregoing, the direction and magnitude of deviation of the light beam 82 with respect to the track 80 can be seen from a difference between the amounts of light received at the time of passing through the position B and at the time of passing through the position C. Consequently, the difference between the amounts of light received at the time of passing through the position B and at the time of passing through the position C can be used as a tracking error signal. The pits 81A serve as the reference of timing for detecting the amounts of light received at the time of passing through the position B and at the time of passing through the position C.

Specifically, the tracking servo in this example is performed in the following manner. Initially, the timing at which the total amount of light received by the photodetector 45 reaches a first peak, i.e., the timing of passing through the position A, is detected. Next, the timing of passing through the position B and the timing of passing through the position C are estimated with reference to the timing of passing through the position A. Next, the amount of light received at the time of passing through the position B and the amount of light received at the time of passing through the position C are detected at the respective estimated timing. Finally, a difference between the amounts of light received at the time of passing through the position B and at the time of passing through the position C is detected as a tracking error signal. Then, the voice coil motor 56 is driven based on the tracking error signal so that the light beam 82 follows the track 80 all the time, thereby effecting tracking servo. However, when the light beam 82 passes through the data areas 7, no tracking servo is performed and the state at the time of passing through the previous address servo area 6 is maintained.

A method for producing the tracking error information and a method for tracking servo in the present embodiment are not limited to the foregoing ones, but a push-pull method may also be used, for example. In this case, the address servo areas 6 are provided with a row of pits along the direction of the track, as positioning information to be used for tracking servo, and then, a variation in the shape of light incident on the light-receiving surface of the photodetector 45 is detected to produce tracking error information.

Figure 9:
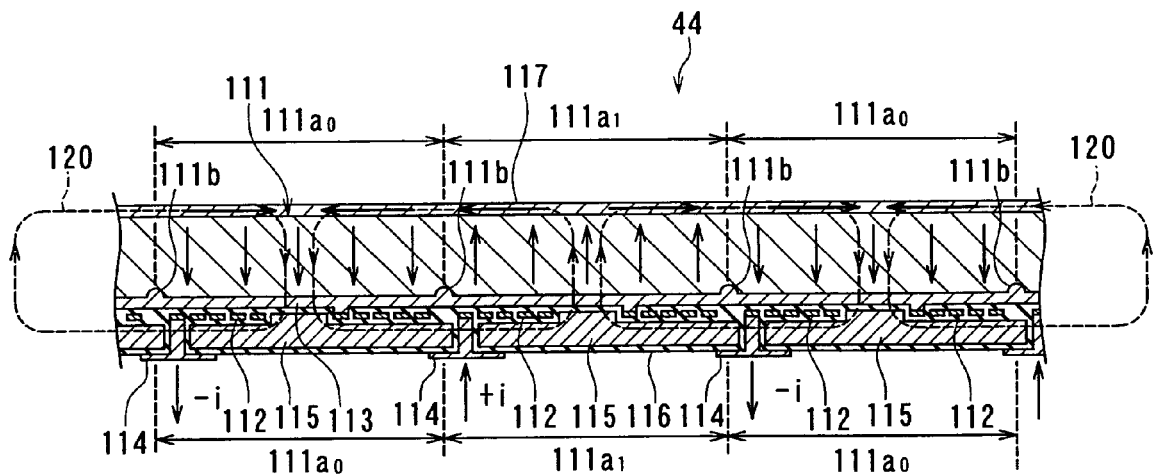
FIG. 9 is a cross-sectional view showing essential parts of a phase spatial light modulator in the first embodiment of the invention.
Figure 10:
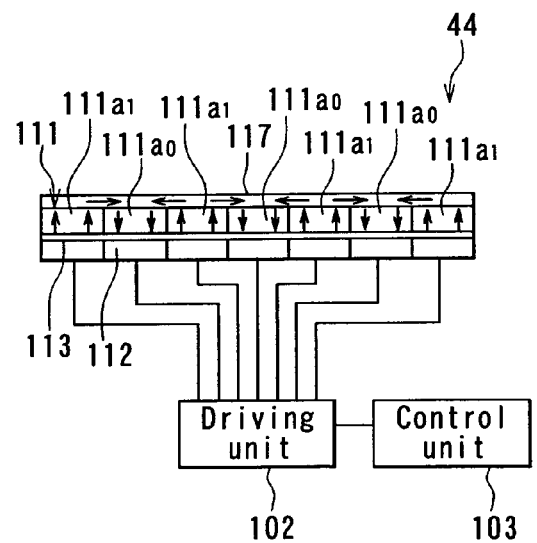
FIG. 10 is an explanatory diagram showing the phase spatial light modulator and its peripheral circuits in the first embodiment of the invention.

Next, with reference to FIG. 9 and FIG. 10, description will be given of an example of configuration of the phase spatial light modulator 44 in the present embodiment. The phase spatial light modulator 44 of this example utilizes a magneto-optic effect. FIG. 9 is a cross-sectional view showing essential parts of the phase spatial light modulator 44 in this example. FIG. 10 is an explanatory diagram showing the phase spatial light modulator 44 and its peripheral circuits in this example.

As shown in FIG. 9 and FIG. 10, the phase spatial light modulator 44 in this example comprises: a magnetization setting layer 111 that is made of a magneto-optical material and includes a plurality of pixels in each of which a direction of magnetization is set independently and each of which causes a rotation of a direction of polarization of incident light according to its direction of magnetization by a magneto-optic effect; thin-film coils 112 serving as a plurality of field generating elements which are arranged in correspondence with the respective pixels of the magnetization setting layer 111, for generating magnetic fields for setting directions of magnetization in the respective pixels independently of each other; and a reflecting layer 113 provided between the magnetization setting layer 111 and the thin-film coils 112, for reflecting light.

Domain wall movement suppressing portions 111b for suppressing the movements of magnetic domain walls are provided in the magnetization setting layer 111 at borders between adjacent pixels. For example, the domain wall movement suppressing portions 111b may be projections such as shown in FIG. 9.

In FIG. 9 and FIG. 10, the reference numeral $111a_0$ represents a pixel that is magnetized downward (hereinafter referred to as OFF pixel). The reference numeral $111a_1$ represents a pixel that is magnetized upward (hereinafter referred to as ON pixel).

Figure 11:
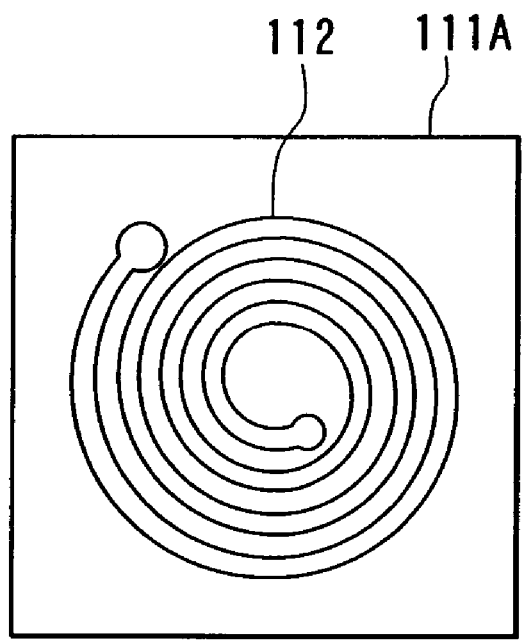
FIG. 11 is a plan view of a thin-film coil in the phase spatial light modulator shown in FIG. 9.

FIG. 11 is a plan view of the thin-film coil 112. In FIG. 11, the reference numeral 111A represents the area of a single pixel.

In FIG. 9 and FIG. 10, the upper surface of the magnetization setting layer 111 is the surface for light to be incident on. The magnetization setting layer 111 has transparency at least to the light in use. The thin-film coils 112 are arranged to be adjacent to the surface of the magnetization setting layer 111 opposite from the surface for light to be incident on, with the reflecting layer 113 placed in between.

The reflecting layer 113 is electrically conductive. One end, or the inner end, for example, of each of the thin-film coils 112 is connected to the reflecting layer 113. A terminal 114 is connected to the other end, or the outer end, for example, of each of the thin-film coils 112. The reflecting layer 113 also functions as one of two conducting paths for energizing the thin-film coils 112. The terminals 114 constitute the other of the two conducting paths for energizing the thin-film coils 112.

The phase spatial light modulator 44 further comprises a magnetic-path-forming portion 115 made of a soft magnetic material. The magnetic-path-forming portion 115 is placed on the side of the thin-film coils 112 opposite from the magnetization setting layer 111, and forms part of magnetic paths 120 corresponding to the magnetic fields generated by the thin-film coils 112. An insulating layer 116 is formed around the thin-film coils 112, the terminals 114, and the magnetic-path-forming portion 115.

The phase spatial light modulator 44 further comprises a soft magnetic layer 117 made of a soft magnetic material.

The soft magnetic layer 117 is provided to be adjacent to the surface of the magnetization setting layer 111 opposite from the thin-film coils 112, and forms another part of the magnetic paths 120 corresponding to the magnetic fields generated by the thin-film coils 112. The soft magnetic layer 117 has transparency at least to the light in use.

As shown in FIG. 10, the individual thin-film coils 112 are connected to a driving unit 102 for energizing the individual thin-film coils 112 independently, through the terminals 114, the reflecting layer 113, and wiring connected thereto. The driving unit 102 supplies a positive- or negative-pulsed current to the thin-film coils 112 at cycles of the order of nanoseconds, for example. The driving unit 102 is controlled by a control unit 103.

The magnetization setting layer 111 has high coercivities of Hc and -Hc. When the magnetization setting layer 111 is magnetized in a positive direction, application of a negative magnetic field exceeding Hc in absolute value inverts the direction of magnetization. When the magnetization setting layer 111 is magnetized in a negative direction, application of a positive magnetic field exceeding Hc in absolute value inverts the direction of magnetization. The thin-film coils 112 generate a positive or negative magnetic field exceeding Hc in absolute value. Meanwhile, the soft magnetic layer 117 has an extremely low coercivity. The direction of magnetization of the soft magnetic layer 117 is easily inverted by application of a low magnetic field. The magnetic-path-forming portion 115 has the same characteristic as that of the soft magnetic layer 117.

The magnetization setting layer 111 may be made of any magneto-optical material having a magneto-optic effect, whereas a magnetic garnet thin film or a one-dimensional magnetic photonic crystal is preferably used in particular.

Typical magnetic garnet thin films are rare-earth iron type garnet thin films. Methods for producing a magnetic garnet thin film include one in which a monocrystalline magnetic garnet thin film is formed on a substrate of gadolinium gallium garnet (GGG) or the like by liquid-phase epitaxy (LPE) or sputtering.

Figure 12:
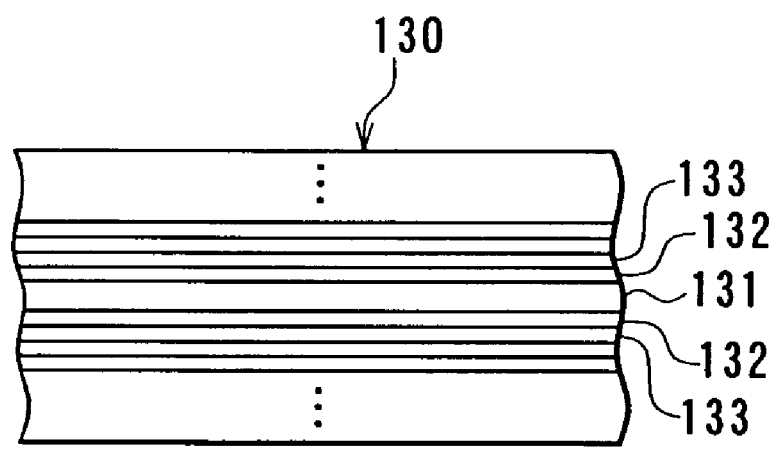
FIG. 12 is an explanatory diagram showing a structure of a one-dimensional magnetic photonic crystal.

FIG. 12 is an explanatory diagram showing a structure of a one-dimensional magnetic photonic crystal. This one-dimensional magnetic photonic crystal 130 has a structure in which dielectric multilayer films are formed on both sides of a magnetic substance layer 131. Rare-earth iron garnet, bismuth-substituted rare-earth iron garnet or the like is used as the material of the magnetic substance layer 131. The dielectric multilayer films are made by laminating $SiO_2$ films 132 and $Ta_2O_5$ films 133 alternately, for example. The layer structure of the one-dimensional magnetic photonic crystal 130 has a cycle on the order of the wavelengths of the light in use. The use of the magnetic photonic crystal 130 allows to achieve greater Faraday rotation angles.

The phase spatial light modulator 44 of this example may be fabricated by forming all the components monolithically, or by forming a plurality of parts separately and then assembling the plurality of parts. In the case of forming the phase spatial light modulator 44 from a plurality of separate parts, a part including the soft magnetic layer 117 to the reflecting layer 113 may be separated from the other parts, for example. All the components of the phase spatial light modulator 44 of this example can be fabricated by using semiconductor fabrication processes.

Next, the operation of the phase spatial light modulator 44 of this example will be described with reference to FIG. 13. In the phase spatial light modulator 44 of this example, the thin-film coils 112 are supplied with a positive- or negative-pulsed current selectively according to modulation information. As a result, the thin-film coils 112 apply a magnetic field to each pixel of the magnetization setting layer 111 separately. By simple calculation, supplying a pulsed current of the order of 40 mA in peak value to the thin-film coils 112 can generate a pulsed magnetic field of the order of 100 Oe at a center of the thin-film coils 112. This magnetic field can invert magnetization of each pixel.

In each pixel, when a magnetic field in a direction opposite to the existing direction of magnetization is applied, a magnetic domain that is magnetized in the same direction as the applied magnetic field is produced, and then, this magnetic domain expands. The expansion of the magnetic domain stops when the magnetic domain walls reach the domain wall movement suppressing portions 111b. As a result, an entire single pixel is magnetized in the same direction as that of the applied magnetic field. In this way, the thin-film coils 112 apply magnetic fields to the respective pixels of the magnetization setting layer 111 independently of each other so that the directions of magnetization of the respective pixels of the magnetization setting layer 111 are set independently.

Light that is incident on the phase spatial light modulator 44 from the side of the soft magnetic layer 117 passes through the soft magnetic layer 117 and then through the magnetization setting layer 111. The light passing through this magnetization setting layer 111 is given a Faraday rotation, that is, a rotation of the direction of polarization according to the direction of magnetization of each pixel of the magnetization setting layer 111 due to the Faraday effect. For example, supposing that the direction of polarization of light passing through an upward-magnetized ON pixel $111a_1$ is rotated by $+\theta_F$, the direction of polarization of light passing through a downward-magnetized OFF pixel $111a_0$ is rotated by $-\theta_F$.

The light having passed through the magnetization setting layer 111 is reflected by the reflecting layer 113, again passes through the magnetization setting layer 111 and the soft magnetic layer 117, and is emitted from the phase spatial light modulator 44. As is the case of passing through the magnetization setting layer 111 before reaching the reflecting layer 113, the light passing through the magnetization setting layer 111 after being reflected by the reflecting layer 113 is given a rotation of the direction of polarization according to the direction of magnetization of each pixel of the magnetization setting layer 111 due to the Faraday effect. Consequently, supposing that the direction of polarization of the light passing through an ON pixel $111a_1$ is rotated by $+\theta_F$ and the direction of polarization of the light passing through an OFF pixel $111a_0$ is rotated by $-\theta_F$ as mentioned above, then the direction of polarization of light emitted from the phase spatial light modulator 44 after passing through an ON pixel $111a_1$ twice, i.e., forward and backward, is rotated by $+2\theta_F$, and the direction of polarization of light emitted from the phase spatial light modulator 44 after passing through an OFF pixel $111a_0$ twice, i.e., forward and backward, is rotated by $-2\theta_F$.

In the phase spatial light modulator 44, the rotation angle $+2\theta_F$ of the direction of polarization of the light passing through an ON pixel $111a_1$ of the magnetization setting layer 111 twice, i.e., forward and backward, is set at 90°, while the rotation angle $-2\theta_F$ of the direction of polarization of the light passing through an OFF pixel $111a_0$ twice, i.e., forward and backward, is set at $-90°$.

Figure 13:
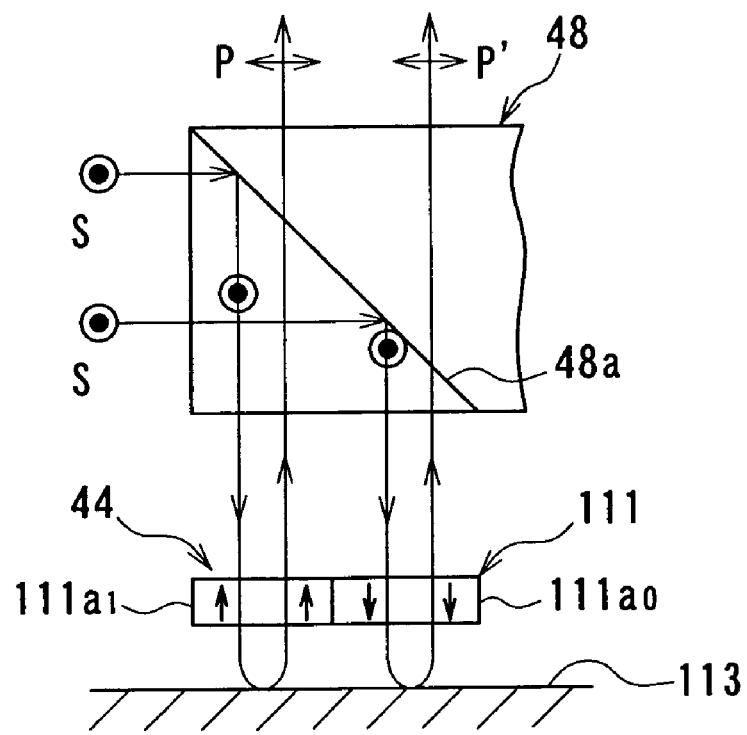
FIG. 13 is an explanatory diagram for explaining the operation of the phase spatial light modulator shown in FIG. 9.

As shown in FIG. 13, S-polarized light, which has been emitted from the semiconductor laser 43 and reflected by the polarization beam splitter surface 48a of the prism block 48, is incident on the phase spatial light modulator 44. This light passes through the magnetization setting layer 111 of the phase spatial light modulator 44, is reflected by the reflecting layer 113, passes through the magnetization setting layer 111 again, and returns to the prism block 48. Here, the light that has passed through an ON pixel $111a_1$ twice, i.e., forward and backward, is subjected to a rotation of the direction of polarization by 90° to become P-polarized light. The light that has passed through an OFF pixel $111a_0$ twice, i.e., forward and backward, is subjected to a rotation of the direction of polarization by $-90°$ to become P-polarized light (in FIG. 13, designated by the symbol P'). Thus, the return light from the phase spatial light modulator 44 is all transmitted through the polarization beam splitter surface 48a.

While the return light from the phase spatial light modulator 44 is all P-polarized, the light that has passed through an ON pixel $111a_1$ and the light that has passed through an OFF pixel $111a_0$ are different from each other by $\pi$ (rad) in phase. Thus, the phase spatial light modulator 44 of this example can spatially modulate the phase of the light by rotating the direction of polarization of the emergent light by 90° with respect to the direction of polarization of the incident light, and by setting the phase of the emergent light for each pixel at either of two values differing by $\pi$ (rad) from each other.

In the phase spatial light modulator 44 of this example, the thin-film coils 112 set the directions of magnetization of the individual pixels of the magnetization setting layer 111 independently of each other, thereby causing a rotation of the direction of polarization of light incident on the magnetization setting layer 111 according to the direction of magnetization of each pixel. The light incident on the magnetization setting layer 111 is thereby modulated spatially. The directions of magnetization of the individual pixels of the magnetization setting layer 111 can be switched within several nanoseconds or so. The phase spatial light modulator 44 of this example has the thin-film coils 112 for the individual pixels so that the directions of magnetization of the individual pixels can be set independently of each other. It is therefore possible to set the directions of magnetization of all the pixels at the same time. Consequently, in the phase spatial light modulator 44 of this example, the response time of the entire phase spatial light modulator 44 can be on the order of several nanoseconds, i.e., the same as that of the pixels. This allows extremely high operation speed.

The phase spatial light modulator 44 of this example is high in reliability since it has a simple structure free of mechanical driving parts and contains no fluid such as liquid crystal. Furthermore, since the phase spatial light modulator 44 of this example is simple in structure and is mass-producible by using semiconductor fabrication processes, it is possible to reduce manufacturing cost.

The phase spatial light modulator 44 of this example is simplified in structure since the reflecting layer 113 also functions as one of the two conducting paths for energizing the thin-film coils 112.

In the phase spatial light modulator 44 of this example, the pixels of the magnetization setting layer 111 can be uniformized in the state of material and the state of magnetization. In the phase spatial light modulator 44 of this example, the thin-film coils 112 for switching the state of the pixels are arranged to be adjacent to the surface of the magnetization setting layer 111 opposite from the surface for light to be incident on, with the reflecting layer 113 in between. Accordingly, the thin-film coils 112 exert no influence on the light to be modulated. Consequently, according to the phase spatial light modulator 44 of this example, it is possible to prevent the emergent light from becoming uneven due to causes other than the modulation information.

Since no transparent electrodes are arranged on the light path, the phase spatial light modulator 44 of this example is free of characteristic deterioration resulting from light dispersion and is advantageous for attaining finer pixels in particular.

According to the phase spatial light modulator 44 of this example, the thin-film coils 112 generate magnetic fields for setting the directions of magnetization of the individual pixels of the magnetization setting layer 111. It is therefore possible to reduce the currents for inverting magnetization of the pixels.

The phase spatial light modulator 44 of this example can narrow magnetic flux effectively since it has the soft magnetic layer 117 and the magnetic-path-forming portion 115 each forming part of the magnetic paths 120 corresponding to the magnetic fields generated by the thin-film coil 112. As a result, the phase spatial light modulator 44 of this example can effectively utilize the magnetomotive force caused by the thin-film coils 112 to set the magnetization in the pixels.

In the phase spatial light modulator 44 of this example, the state of magnetization of the individual pixels of the magnetization setting layer 111 is maintained unless the thin-film coils 112 are driven. The phase spatial light modulator 44 can thus retain the modulation information.

While the phase spatial light modulator 44 described above sets the phase of emergent light at either of two values pixel by pixel, the optical information recording/reproducing apparatus according to the embodiment may use, instead of this phase spatial light modulator 44, one capable of setting the phase of the emergent light at any of three or more values pixel by pixel.

Figure 14:
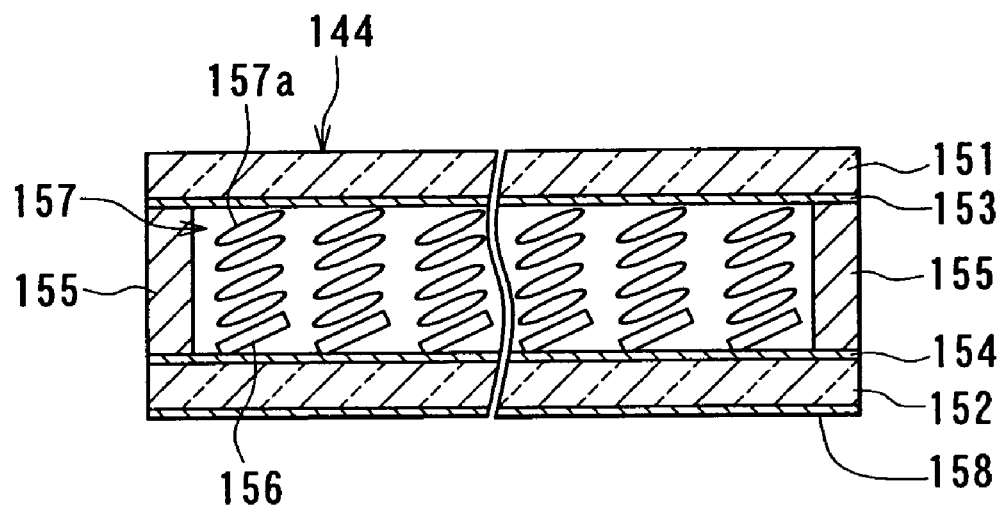
FIG. 14 is a cross-sectional view showing another example of configuration of the phase spatial light modulator in the first embodiment of the invention.

FIG. 14 shows an example of configuration of the phase spatial light modulator which is capable of setting the phase of emergent light at any of three or more values pixel by pixel. This phase spatial light modulator 144 is provided with two glass substrates 151 and 152 arranged to oppose to each other. The mutually opposing surfaces of the glass substrates 151 and 152 are provided with transparent electrodes 153 and 154, respectively. The glass substrates 151 and 152 are spaced at a predetermined distance by spacers 155. Liquid crystal is filled into the space formed by the glass substrates 151, 152 and the spacers 155, thereby forming a liquid crystal layer 157. A number of column-shaped orientation portions 156 are formed to protrude obliquely from a surface of the glass substrate 152 facing the liquid crystal layer 157. These orientation portions 156 can be formed, for example, by depositing vapor deposition material on the glass substrate 152 in an oblique direction. Liquid crystal molecules 157a in the liquid crystal layer 157 are oriented so that their major-axis directions are along the longitudinal direction of the orientation portions 156, i.e., in a direction oblique to the glass substrate 152. The liquid crystal molecules 157a shall be positive in dielectric anisotropy. In addition, a reflecting film 158 is formed on the external surface of the glass substrate 152.

Next, the operation of the phase spatial light modulator 144 shown in FIG. 14 will be described with reference to FIG. 15 and FIG. 16. Light is incident on the phase spatial light modulator 144 from the side of the glass substrate 151, passes through the glass substrate 151, the liquid crystal layer 157, and the glass substrate 152, is reflected by the reflecting film 158, and passes through the glass substrate 152, the liquid crystal layer 157, and the glass substrate 151 again for emission. The transparent electrodes 153 and 154 can apply a voltage to between the transparent electrodes 153 and 154 for each pixel independently.

Figure 15:
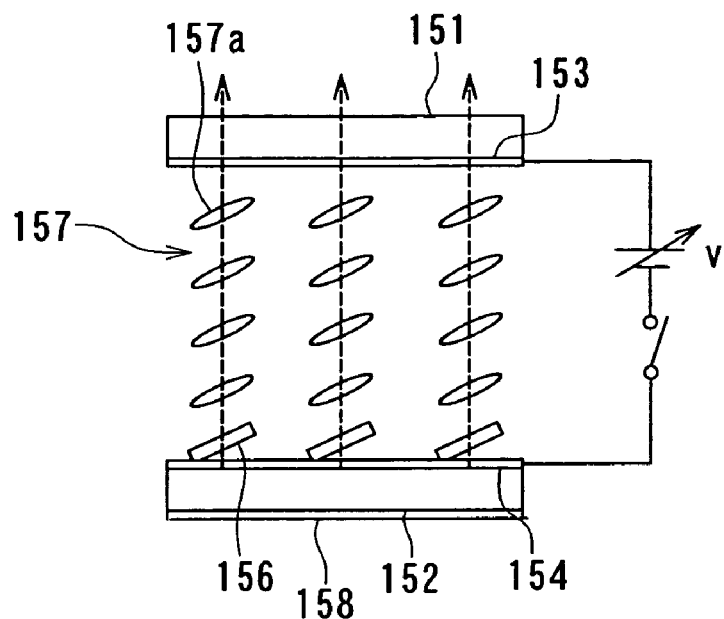
FIG. 15 is an explanatory diagram for explaining the operation of the phase spatial light modulator shown in FIG. 14.
Figure 16:
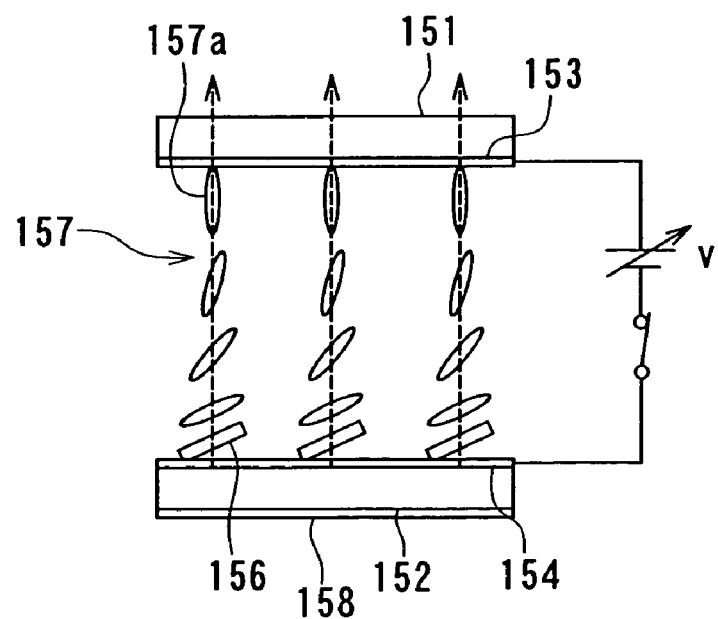
FIG. 16 is an explanatory diagram for explaining the operation of the phase spatial light modulator shown in FIG. 14.

As shown in FIG. 15, when a voltage V is not applied to between the transparent electrodes 153 and 154, the liquid crystal molecules 157a are oriented so that their major-axis directions are in a direction oblique to the glass substrates 151 and 152. In contrast, as shown in FIG. 16, when a voltage V sufficient to change the orientations of the liquid crystal molecules 157a is applied to between the transparent electrodes 153 and 154, at least some of the liquid crystal molecules 157a change in orientation so that their major-axis directions approach a direction perpendicular to the glass substrates 151 and 152. In this case, liquid crystal molecules 157a closer to the glass substrate 151, which has no orientation portion 156, are more apt to change in orientation. Besides, the number of liquid crystal molecules 157a to change in orientation and the amounts of change in orientation increase with increasing voltage V.

When liquid crystal molecules 157a change in orientation, the angles formed between the direction of polarization of incident light and the major-axis directions of the liquid crystal molecules 157a change. The liquid crystal molecules 157a differ in refractive index between when the direction of polarization of light passing therethrough is parallel to the major-axis directions of the liquid crystal molecules 157a and when it is perpendicular to the same. Thus, light which has passed through the liquid crystal layer 157 with a voltage V applied has a phase difference from light which has passed through the liquid crystal layer 157 with no voltage V applied. When the voltage V falls within a predetermined range, the phase difference increases with an increase in the voltage V. Moreover, when the voltage V is constant, the phase difference increases with an increase in the thickness of the liquid crystal layer 157. Consequently, if the thickness of the liquid crystal layer 157 and the maximum value of the voltage V are set so that the maximum phase difference should be $\pi$ (rad) when light passes through the liquid crystal layer 157 twice, i.e., forward and backward, it is possible to set the phase difference arbitrarily within a range of 0 to $\pi$ (rad) by controlling the voltage V.

Through the operation described above, the phase spatial light modulator 144 can set the phase of the emergent light at any of three or more values pixel by pixel.

Incidentally, the phase spatial light modulator 144 does not cause a rotation of a direction of polarization of light. Thus, when the phase spatial light modulator 144 is used instead of the phase spatial light modulator 44, the polarization beam splitter surface 48a of the prism block 48 shown in FIG. 4 is replaced with a semi-reflecting surface. Alternatively, a quarter-wave plate may be provided between the prism block 48 and the phase spatial light modulator 144, so that S-polarized light from the prism block 48 is converted into circularly-polarized light by the quarter-wave plate and incident on the phase spatial light modulator 144, and that the circularly-polarized light from the phase spatial light modulator 144 is converted into P-polarized light by the quarter-wave plate and transmitted through the polarization beam splitter surface 48a.

The phase spatial light modulator capable of setting the phase of emergent light at any of three or more values pixel by pixel is not limited to the above-described phase spatial light modulator 144 in which liquid crystal is used, but may be one in which micromirror devices are used to adjust the position of the reflecting surface with respect to the traveling direction of incident light pixel by pixel.

As described in the foregoing, in the present embodiment, for information recording, the information recording layer 3 of the optical information recording medium 1 is irradiated with the information light that is spatially modulated in phase based on information to be recorded, and the recording-specific reference light, so that the information is recorded on the information recording layer 3 in the form of an interference pattern resulting from interference between the information light and the recording-specific reference light. For information reproduction, the information recording layer 3 is irradiated with the reproduction-specific reference light. Then, reproduction light thereby generated from the information recording layer 3 is superimposed on the reproduction-specific reference light to produce composite light, and this composite light is detected to reproduce the information.

Consequently, according to the embodiment, the reproduction light and the reproduction-specific reference light need not be separated from each other at the time of information reproduction. Then, at the time of information recording, it is not necessary that the information light and the recording-specific reference light form a predetermined angle therebetween when incident on the recording medium. In fact, in the embodiment, irradiation with the information light, the recording-specific reference light and the reproduction-specific reference light, and collection of the reproduction light are performed on the same side of the information recording layer 3 so that the information light, the recording-specific reference light, the reproduction-specific reference light and the reproduction light are arranged coaxially. Accordingly, the embodiment allows a compact configuration of the optical system for recording and reproduction.

In conventional methods for reproduction, the reproduction light and the reproduction-specific reference light are separated to detect the reproduction light alone. Hence, there has been a problem that the reproduced information deteriorates in S/N ratio if the reproduction-specific reference light is also incident on the photodetector for detecting the reproduction light. On the contrary, in the present embodiment, both the reproduction light and the reproduction-specific reference light are used to reproduce information, and therefore the S/N ratio of the reproduced information cannot be deteriorated by the reproduction-specific reference light. Consequently, the present embodiment can improve the S/N ratio of the reproduced information.

In the optical information recording/reproducing apparatus according to the embodiment, the optical head 40 has the flying-type head body 41 for accommodating the recording/reproducing optical system. Therefore, according to the embodiment, an almost constant distance is maintained between the objective lens 50 of the recording/reproducing optical system and the optical information recording medium 1, and this eliminates the need for focus servo.

In the optical information recording/reproducing apparatus according to the embodiment, when the phase of the information light is set at either of two values, the information light and the reproduction light carry a single bit of information per pixel. When the phase of the information light is set at any of three or more values, the information light and the reproduction light are able to carry a plurality of bits of information per pixel. For example, when the phase of the information light is set at any of eight values, the information light and the reproduction light carry three bits of information per pixel. In the information light and the reproduction light, a plurality of pixels may be used to represent a single piece of data. For example, when the phase of the information light is set at any of eight values and four pixels represent a single piece of data, the four pixels are able to represent 12 bits of data.

[Second Embodiment]

Now, description will be given of an optical information recording/reproducing apparatus according to a second embodiment of the invention. The present embodiment uses recording-specific reference light and reproduction-specific reference light that are spatially modulated in phase, thereby allowing both multiple recording by phase encoding multiplexing and reproduction of the information multiple-recorded in this way. The optical information recording/reproducing apparatus according to the embodiment has the same configuration as in the first embodiment.

Figure 17:
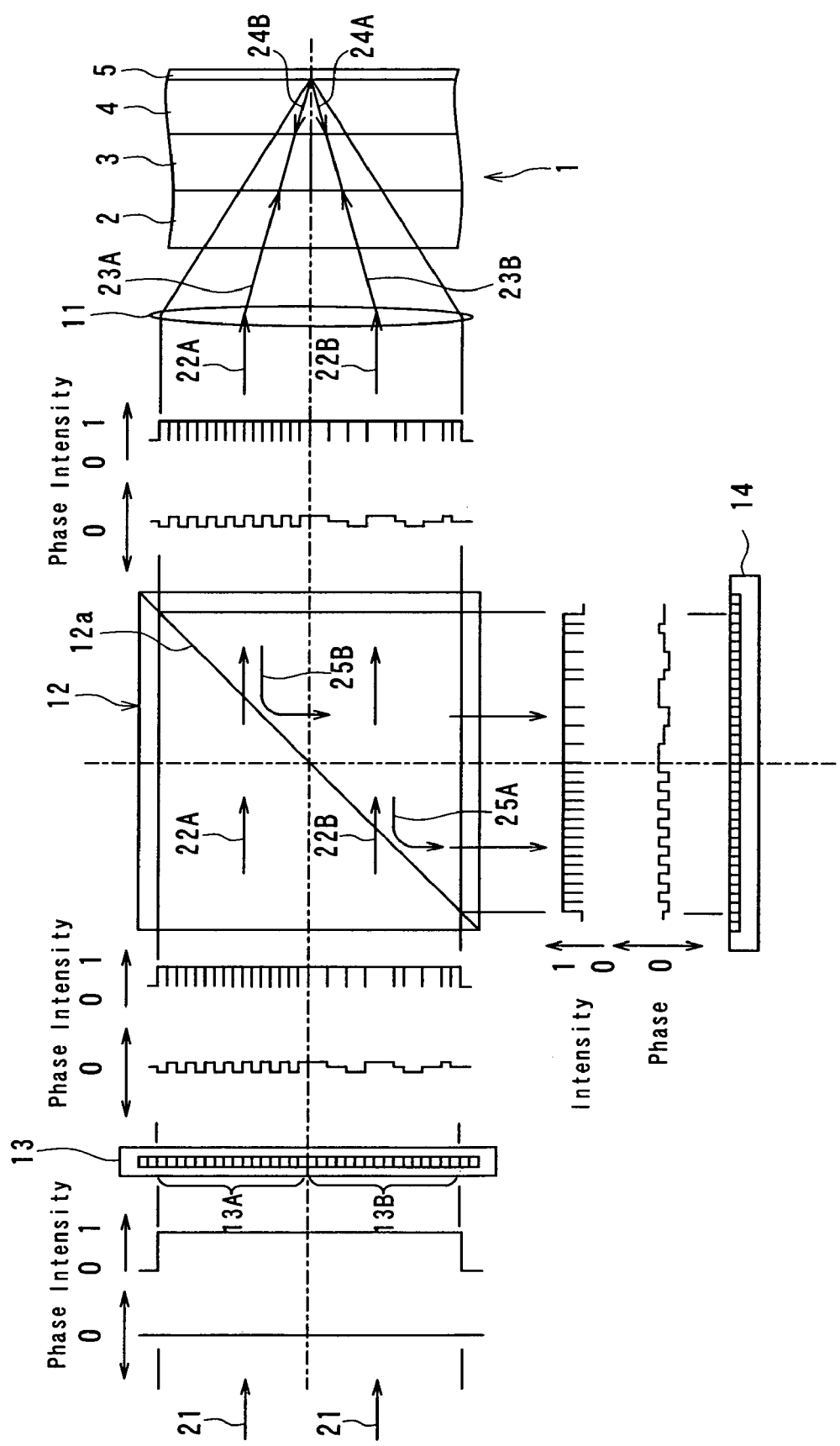
FIG. 17 is an explanatory diagram showing the principle of information recording in an optical information recording/reproducing apparatus according to a second embodiment of the invention.

Next, with reference to FIG. 17, description will be given of the principle of information recording in the optical information recording/reproducing apparatus according to the embodiment, i.e., an optical information recording method according to the embodiment. FIG. 17 shows part of an example of the recording/reproducing optical system in the optical information recording/reproducing apparatus according to the embodiment. The optical system shown in FIG. 17 has the same configuration as in FIG. 1. FIG. 17 illustrates the phases and intensities of incident light on the phase spatial light modulator 13, emergent light from the phase spatial light modulator 13, incident light on the objective lens 11 yet to irradiate the optical information recording medium 1 with, and return light from the optical information recording medium 1 reflected by the semi-reflecting surface 12a of the beam splitter 12. In FIG. 17, the phases and intensities are expressed in the same manner as in FIG. 1.

When recording information, coherent parallel light 21 having a constant phase and intensity is incident on the phase spatial light modulator 13. A half area 13A of the phase spatial light modulator 13 selects the phase of emergent light from between two values or from among three or more values pixel by pixel based on information to be recorded, thereby generating information light 22A that is spatially modulated in phase. Here, for ease of explanation, the area 13A shall modulate the phase of the emergent light spatially by setting the phase of the emergent light to either a first phase having a phase difference of $+\pi/2$ (rad) with respect to a predetermined reference phase or a second phase having a phase difference of $-\pi/2$ (rad) with respect to the reference phase pixel by pixel. Meanwhile, the other half area 13B of the phase spatial light modulator 13 selects the phase of the emergent light from between two values or from among three or more values pixel by pixel, thereby generating recording-specific reference light 22B that is spatially modulated in phase. Here, for ease of explanation, the area 13B shall modulate the phase of the emergent light spatially by setting the phase of the emergent light at any of the reference phase, the first phase, and the second phase pixel by pixel.

The information light 22A and the recording-specific reference light 22B are incident on the beam splitter 12. Part of them pass through the semi-reflecting surface 12a, and further through the objective lens 11 to turn into converging information light 23A and converging recording-specific reference light 23B, respectively, with which the optical information recording medium 1 is irradiated. The information light 23A and the recording-specific reference light 23B pass through the information recording layer 3, converge to a minimum diameter on the interface between the air gap layer 4 and the reflecting film 5, and are reflected by the reflecting film 5. Information light 24A and recording-specific reference light 24B that has been reflected by the reflecting film 5 become divergent light to pass through the information recording layer 3 again.

In the information recording layer 3, the information light 23A yet to be reflected by the reflecting film 5 and the recording-specific reference light 24B that has been reflected by the reflecting film 5 interfere with each other to form an interference pattern, and the information light 24A that has been reflected by the reflecting film 5 and the recording-specific reference light 23B yet to be reflected by the reflecting film 5 interfere with each other to form an interference pattern. Then, these interference patterns are volumetrically recorded in the information recording layer 3.

The information light 24A and the recording-specific reference light 24B having been reflected by the reflecting film 5 are emitted from the optical information recording medium 1, and become parallel information light 25A and parallel recording-specific reference light 25B through the objective lens 11. The light 25A and the light 25B are incident on the beam splitter 12. Part of them are reflected by the semi-reflecting surface 12a, and received by the photodetector 14.

Figure 18:
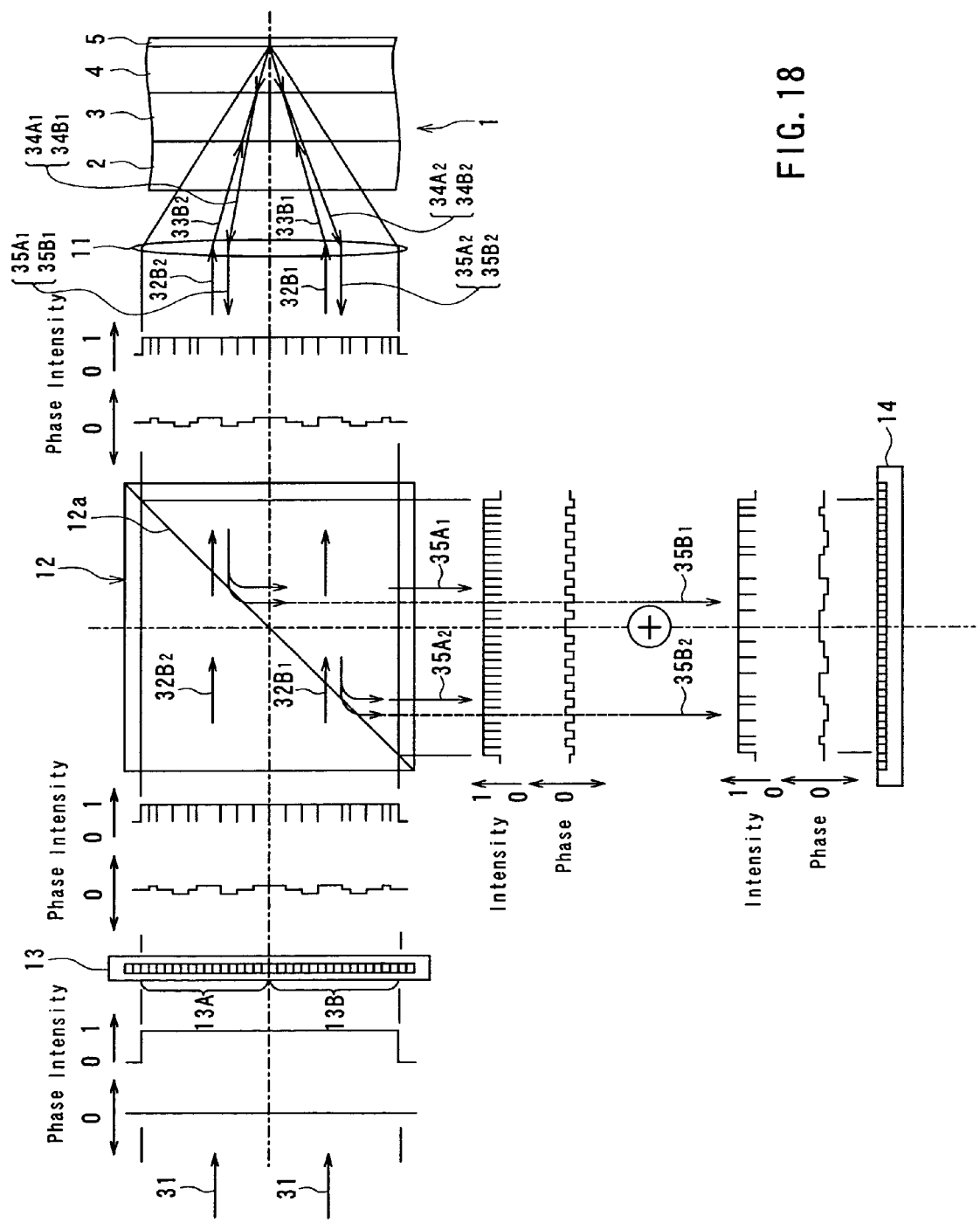
FIG. 18 is an explanatory diagram showing the principle of information reproduction in the optical information recording/reproducing apparatus according to the second embodiment of the invention.

Next, with reference to FIG. 18, description will be given of the principle of information reproduction in the optical information recording/reproducing apparatus according to the embodiment, i.e., an optical information reproducing method according to the embodiment. FIG. 18 shows, like FIG. 17, part of an example of the recording/reproducing optical system in the optical information recording/reproducing apparatus according to the embodiment. FIG. 18 illustrates the phases and intensities of incident light on the phase spatial light modulator 13, emergent light from the phase spatial light modulator 13, incident light on the objective lens 11 yet to irradiate the optical information recording medium 1 with, and return light from the optical information recording medium 1 reflected by the semi-reflecting surface 12a of the beam splitter 12. In FIG. 18, the phases and intensities are expressed in the same manner as in FIG. 17.

When reproducing information, coherent parallel light 31 having a constant phase and intensity is incident on the phase spatial light modulator 13. The half area 13B of the phase spatial light modulator 13 selects the phase of the emergent light from between two values or from among three or more values pixel by pixel, thereby generating reproduction-specific reference light $32B_1$ that is spatially modulated in phase in the same modulation pattern as that of the recording-specific reference light 22B. On the other hand, the half area 13A of the phase spatial light modulator 13 selects the phase of the emergent light from between two values or from among three or more values pixel by pixel, thereby generating reproduction-specific reference light $32B_2$ that is spatially modulated in phase in a pattern that is point-symmetric to the modulation pattern of the reproduction-specific reference light $32B_1$ about a position of optical axis of the optical system that irradiates the information recording layer 3 with the recording-specific reference light and the reproduction-specific reference light.

The reproduction-specific reference light $32B_1$ and the reproduction-specific reference light $32B_2$ are incident on the beam splitter 12. Part of them pass through the semi-reflecting surface 12a, and further through the objective lens 11 to turn into converging reproduction-specific reference light $33B_1$ and $33B_2$, respectively, with which the optical information recording medium 1 is irradiated. The reproduction-specific reference light $33B_1$ and the reproduction-specific reference light $33B_2$ pass through the information recording layer 3, converge to a minimum diameter on the interface between the air gap layer 4 and the reflecting film 5, and are reflected by the reflecting film 5. Having been reflected by the reflecting film 5, the reproduction-specific reference light become divergent light to pass through the information recording layer 3 again.

In the information recording layer 3, the reproduction-specific reference light $33B_2$ yet to be reflected by the reflecting film 5 causes reproduction light that travels away from the reflecting film 5, while the reproduction-specific reference light $33B_2$ having been reflected by the reflecting film 5 causes reproduction light that travels toward the reflecting film 5. The reproduction light traveling away from the reflecting film 5 is emitted as-is from the optical information recording medium 1. The reproduction light traveling toward the reflecting film 5 is reflected by the reflecting film 5 and emitted from the optical information recording medium 1. Both of the reproduction light are represented by reference numeral $34A_1$.

In the information recording layer 3, on the other hand, the reproduction-specific reference light $33B_1$ yet to be reflected by the reflecting film 5 causes reproduction light that travels away from the reflecting film 5, while the reproduction-specific reference light $33B_1$ having been reflected by the reflecting film 5 causes reproduction light that travels toward the reflecting film 5. The reproduction light traveling away from the reflecting film 5 is emitted as-is from the optical information recording medium 1. The reproduction light traveling toward the reflecting film 5 is reflected by the reflecting film 5 and emitted from the optical information recording medium 1. Both of the reproduction light are represented by reference numeral $34A_2$.

Meanwhile, the reproduction-specific reference light $33B_1$ is reflected by the reflecting film 5 and becomes reproduction-specific reference light $34B_1$ that travels in the same direction as the reproduction light $34A_1$ does. The reproduction-specific reference light $33B_2$ is reflected by the reflecting film 5 and becomes reproduction-specific reference light $34B_2$ that travels in the same direction as the reproduction light $34A_2$ does.

The reproduction light $34A_1$, $34A_2$ and the reproduction-specific reference light $34B_1$, $34B_2$ are turned into parallel reproduction light $35A_1$, $35A_2$ and parallel reproduction-specific reference light $35B_1$, $35B_2$ through the objective lens 11, respectively, and are incident on the beam splitter 12. Then, part of them are reflected by the semi-reflecting surface 12a and received by the photodetector 14.

Both the reproduction light $35A_1$ and the reproduction light $35A_2$ are spatially modulated in phase as the information light for recording. The phase modulation patterns of the reproduction light $35A_1$ and the reproduction light $35A_2$ are mutually symmetrical with respect to a point.

Composite light produced by superimposing the reproduction light $35A_1$ on the reproduction-specific reference light $35B_1$ is incident on a half area of the photodetector 14. Composite light produced by superimposing the reproduction light $35A_2$ on the reproduction-specific reference light $35B_2$ is incident on the other half area of the photodetector 14. Both of the two types of composite light are spatially modulated in intensity according to the information recorded. The intensity modulation patterns of the two types of composite light are mutually symmetrical with respect to a point. Thus, the photodetector 14 can reproduce information by detecting a two-dimensional pattern of intensity of one of the two types of composite light. Here, information shall be reproduced by detecting the two-dimensional pattern of intensity of the composite light produced by superimposing the reproduction light 35A$_1$ on the reproduction-specific reference light 35B$_1$.

Figure 19:
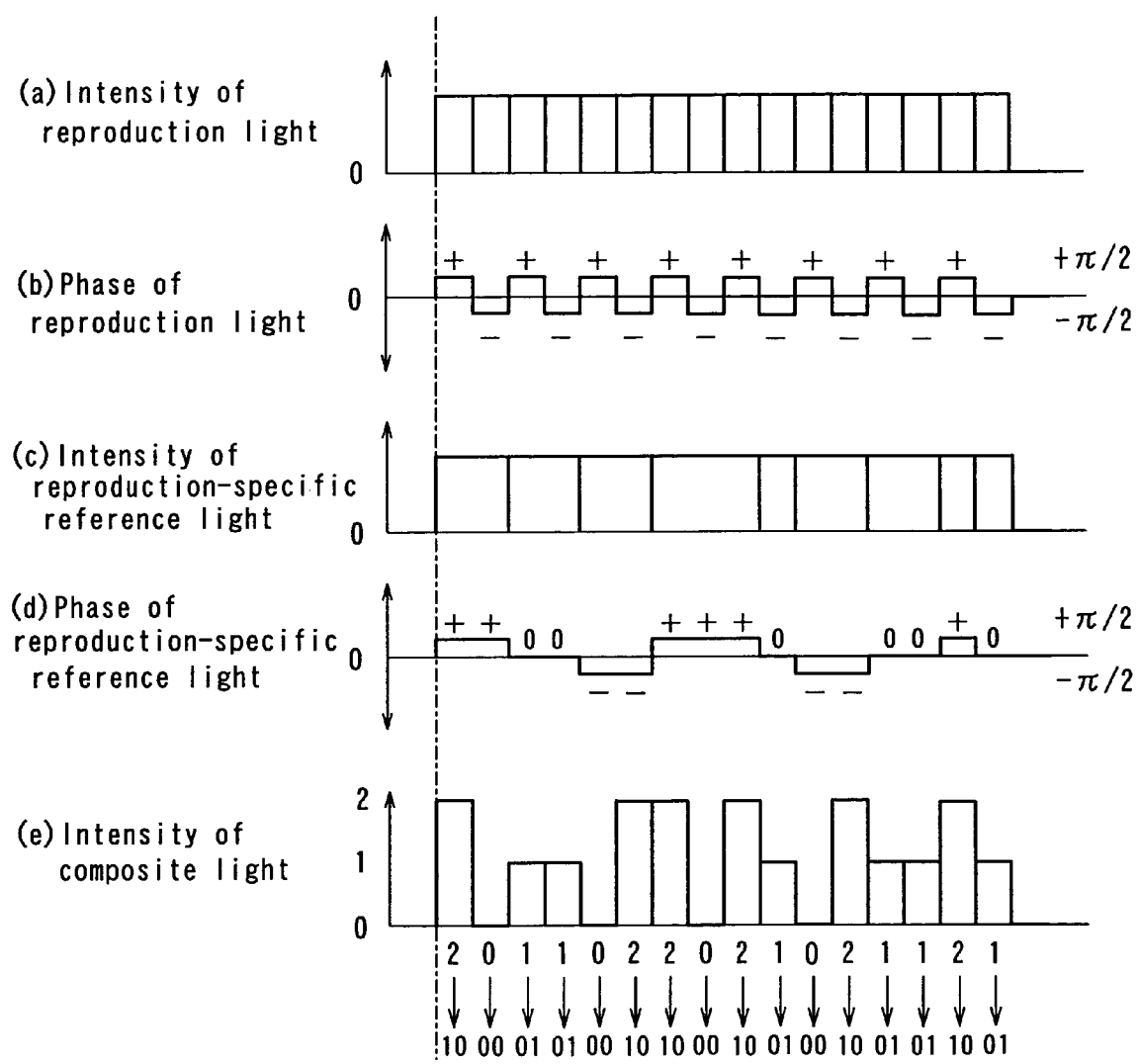
FIG. 19 is a waveform diagram for explaining in detail the principle of information reproduction in the optical information recording/reproducing apparatus according to the second embodiment of the invention.

Next, the reproduction light, the reproduction-specific reference light, and the composite light mentioned above will be described in detail with reference to FIG. 19. In FIG. 19, (a) shows the intensity of the reproduction light, (b) the phase of the reproduction light, (c) the intensity of the reproduction-specific reference light, (d) the phase of the reproduction-specific reference light, and (e) the intensity of the composite light. FIG. 19 shows an example where the phase of the information light is set at either the first phase or the second phase pixel by pixel, and the phases of the recording-specific reference light and the reproduction-specific reference light are set at any of the reference phase, the first phase, and the second phase pixel by pixel. In this case, the phase of the reproduction light for each pixel is either the first phase or the second phase like the information light. Consequently, the phase difference between the reproduction light and the reproduction-specific reference light is any of zero, ±π/2 (rad), and ±π (rad). Suppose here that the intensity of the reproduction light and the intensity of the reproduction-specific reference light are equal. In that case, as shown in FIG. 19(e), the intensity of the composite light becomes maximum at pixels where the phase difference between the reproduction light and the reproduction-specific reference light is zero and becomes theoretically zero at pixels where the phase difference between the reproduction light and the reproduction-specific reference light is ±π (rad). At pixels where the phase difference between the reproduction light and the reproduction-specific reference light is ±π/2 (rad), the intensity becomes ½ that at a zero-phase-difference pixel. In FIG. 19(e), the intensity at the pixels where the phase difference is ±π (rad) is represented by "0", the intensity at the pixels where the phase difference is ±π/2 (rad) is represented by "1", and the intensity at the pixels where the phase difference is zero is represented by "2".

In the example shown in FIG. 17 through FIG. 19, the intensity of the composite light has three values for each pixel. Then, for example, the intensity "0" can be associated with two bits of data "00", the intensity "1" with two bits of data "01", and the intensity "2" with two bits of data "10" as shown in FIG. 19(e). Thus, in the example shown in FIG. 17 through FIG. 19, the composite light can carry an increased amount of information with the same intensity and phase of the reproduction light as compared to the cases where the intensity of the composite light has two values for each pixel as shown in FIG. 1 through FIG. 3. As a result, the optical information recording medium 1 can be enhanced in recording density.

Where the phase difference between the reproduction light and the reproduction-specific reference light is expressed as δ, the intensity I of the composite light is given by the equation (1) mentioned previously. The equation (1) shows that the intensity I of the composite light varies according to the phase difference between the reproduction light and the reproduction-specific reference light. Consequently, when the absolute value of the phase difference between the reproduction light and the reproduction-specific reference light, i.e., the absolute value of the phase difference between the information light and the reproduction-specific reference light, has n values (n is an integer no less than 2) within the range of 0 to π (rad), for example, the intensity I of the composite light also has the n values.

Meanwhile, when the information light and the recording-specific reference light that are spatially modulated in phase are used to record information on the information recording layer 3 of the optical information recording medium 1 as in the present embodiment, the phase modulation pattern of the information light is determined based on the information to be recorded and the phase modulation pattern of the recording-specific reference light to be used in recording the information. This will be described in detail with reference to FIG. 19. Since the information recorded on the information recording layer 3 is reproduced based on the intensity pattern of the composite light, the information to be recorded is converted into data on a desired intensity pattern of the composite light as shown in FIG. 19(e). The phase modulation pattern of the recording-specific reference light is the same as the phase modulation pattern of the reproduction-specific reference light as shown in FIG. 19(d). By means of phase calculation using the data on the desired intensity pattern of the composite light as shown in FIG. 19(e) and the data on the phase modulation patterns of the reproduction-specific reference light and the recording-specific reference light as shown in FIG. 19(d), the phase modulation pattern of the information light is determined so as to be the same as or point-symmetric to the desired phase modulation pattern of the reproduction light as shown in FIG. 19(b).

The information recording layer 3 on which information is recorded by using the information light having the phase modulation pattern determined as described above and the recording-specific reference light may be irradiated with the reproduction-specific reference light having the phase modulation pattern as shown in FIG. 19(d), which is the same as the phase modulation pattern of the recording-specific reference light. In such a case, composite light having the intensity pattern as shown in FIG. 19(e) is obtained. The information recorded on the information recording layer 3 is reproduced based on the intensity pattern of this composite light.

The phase modulation patterns of the recording-specific reference light and the reproduction-specific reference light may be produced from information unique to an individual who is a user. Such information unique to an individual includes a personal identification number, a fingerprint, a voiceprint, and an iris pattern. In that case, information can be reproduced only by the certain individual who recorded the information on the optical information recording medium 1.

As has been described, according to the embodiment, the use of the recording-specific reference light and the reproduction-specific reference light that are spatially modulated in phase allows both the multiple recording by phase encoding multiplexing and reproduction of the information multiple-recorded in this way.

The remainder of the configuration, operations, and effects of the present embodiment are the same as those of the first embodiment.

[Third Embodiment]

Figure 20:
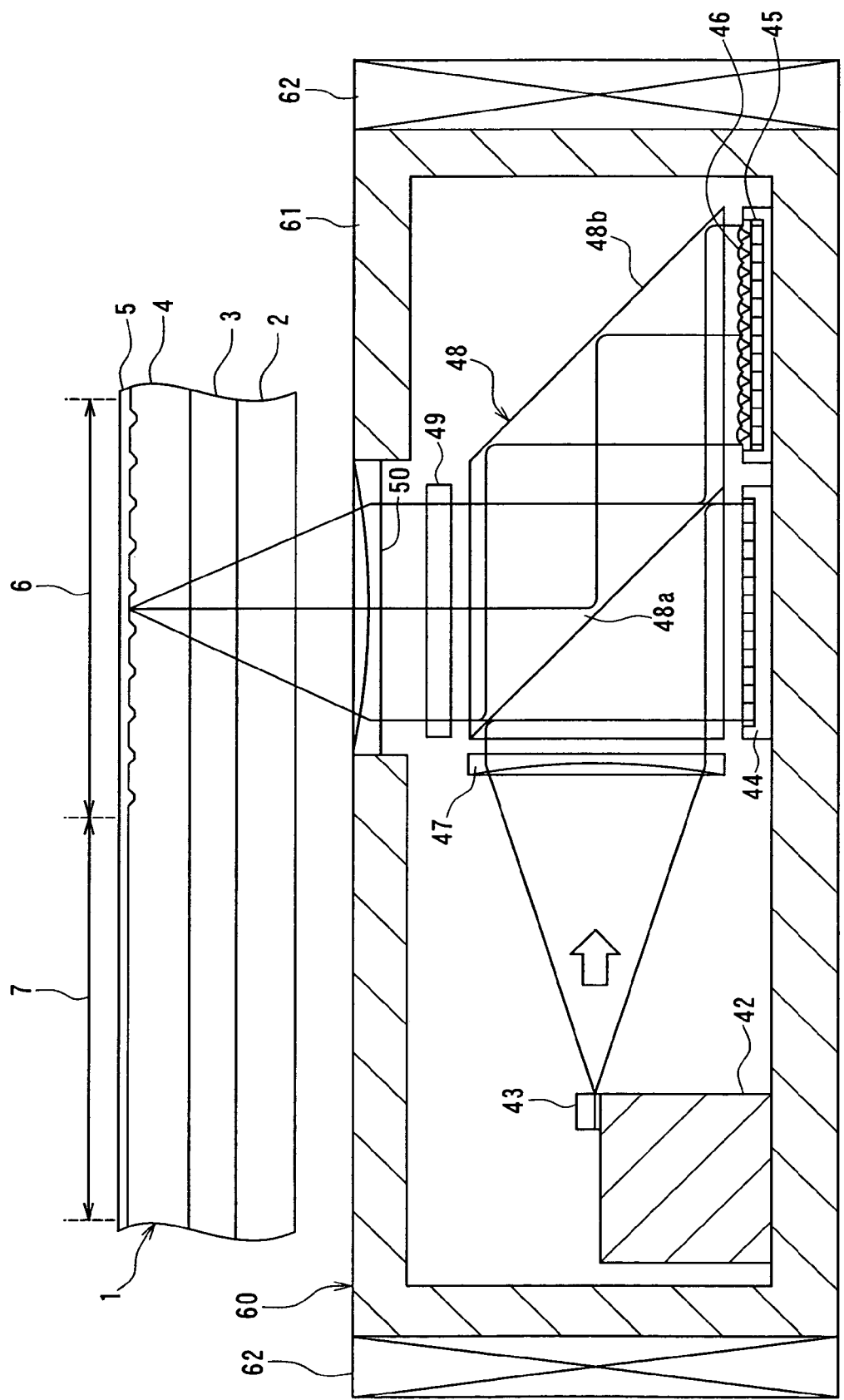
FIG. 20 is a cross-sectional view showing an optical head of an optical information recording/reproducing apparatus according to a third embodiment of the invention.

Now, description will be given of an optical information recording/reproducing apparatus according to a third embodiment of the invention. FIG. 20 is a cross-sectional view showing an optical head of the optical information recording/reproducing apparatus according to the embodiment. The optical information recording/reproducing apparatus according to the embodiment is provided with an optical head 60 instead of the optical head 40 of the first embodiment. The optical head 60 has an optical head body 61 for accommodating a recording/reproducing optical system, and an actuator 62 capable of moving the optical head body 61 in a direction perpendicular to the optical information recording medium 1 and in a direction across the tracks of the optical information recording medium 1 within respective predetermined ranges. The recording/reproducing optical system in the present embodiment has the same configuration as in the first embodiment.

In the present embodiment, address information, tracking error information, and focus servo information are obtained from the output of the photodetector 45 while a light beam from the objective lens 50 passes through the address servo areas 6 of the optical information recording medium 1. The method for producing the tracking error information in the present embodiment is the same as in the first embodiment.

Figure 21:
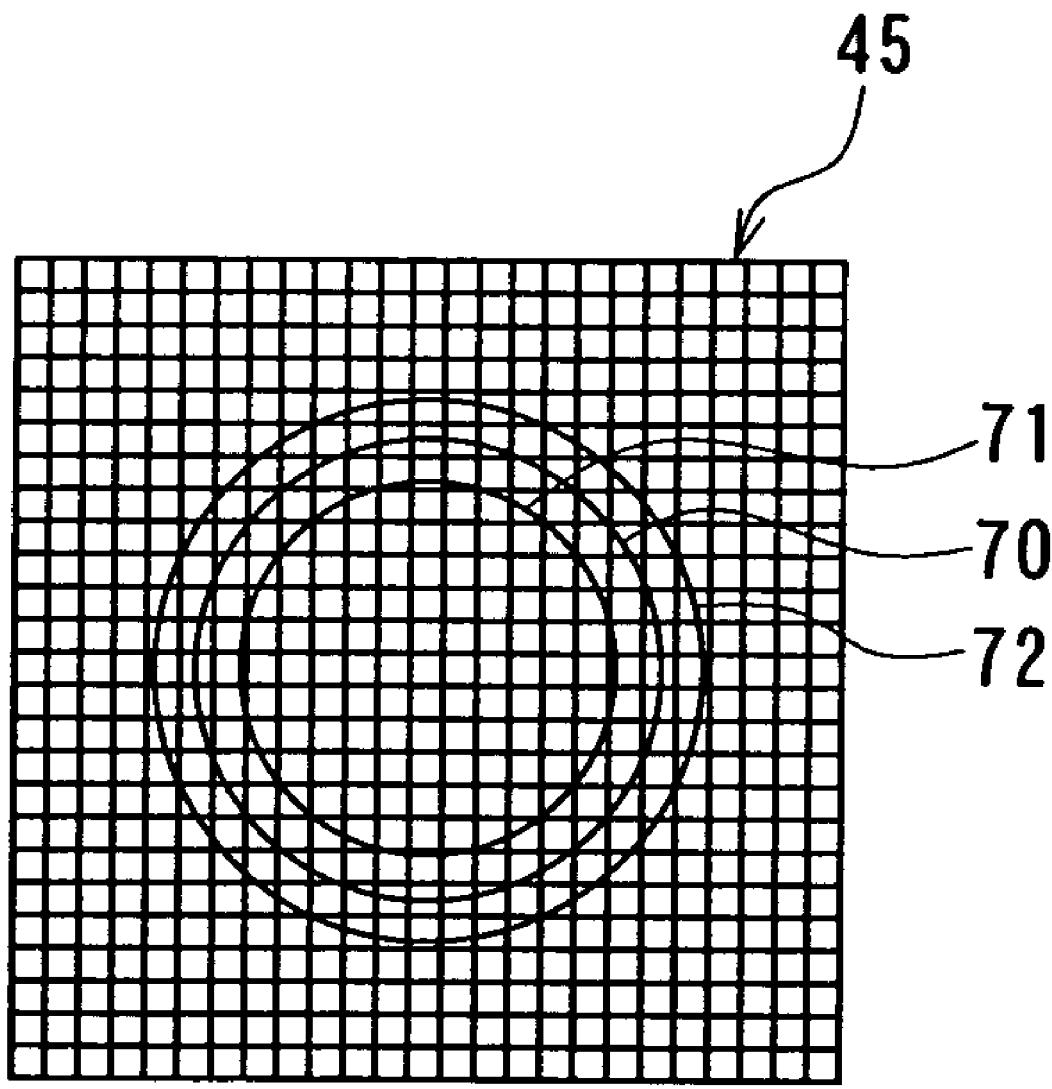
FIG. 21 is an explanatory diagram for explaining an example of a method for producing focus error information in the third embodiment of the invention.

Next, reference is made to FIG. 21 to describe an example of a method for producing the focus error information in the present embodiment. FIG. 21 is an explanatory diagram showing the outline of incident light on the light-receiving surface of the photodetector 45. In the method for producing the focus error information of this example, the focus error information is produced based on the size of the outline of the incident light on the light-receiving surface of the photodetector 45 in the following manner. Initially, in a focused state where the light beam from the objective lens 50 converges to a minimum diameter on the interface between the air gap layer 4 and the reflecting film 5 of the optical information recording medium 1, the incident light on the light-receiving surface of the photodetector 45 shall have the outline designated by the reference numeral 70 in FIG. 21. If the position at which the light beam from the objective lens 50 has the minimum diameter shifts back from the interface between the air gap layer 4 and the reflecting film 5, the outline of the incident light on the light-receiving surface of the photodetector 45 decreases in diameter as shown by the reference numeral 71 in FIG. 21. On the other hand, if the position at which the light beam from the objective lens 50 has the minimum diameter shifts forward beyond the interface between the air gap layer 4 and the reflecting film 5, the outline of the incident light on the light-receiving surface of the photodetector 45 increases in diameter as shown by the reference numeral 72 in FIG. 21. Consequently, a focus error signal can be obtained by detecting a signal responsive to a change in the diameter of the outline of the incident light on the light-receiving surface of the photodetector 45, with reference to the focused state. Specifically, for example, the focus error signal can be produced based on fluctuations in the number of pixels corresponding to a bright area in the light-receiving surface of the photodetector 45 with reference to the focused state.

In the present embodiment, the actuator 62 adjusts the position of the optical head body 61 in a direction perpendicular to the optical information recording medium 1 based on the focus error signal so that the light beam is always in the focused state, thereby effecting focus servo. Moreover, the actuator 62 adjusts the position of the optical head body 61 in a direction across the tracks based on the tracking error signal so that the light beam follows the tracks all the time, thereby effecting tracking servo. When the light beam passes through the data areas 7, neither the focus servo nor the tracking servo is performed and the state at the passing of the previous address servo area 6 is maintained.

The remainder of the configuration, operations, and effects of the present embodiment are the same as those of the first or second embodiment.

The present invention is not limited to the foregoing embodiments but may be modified in various ways. For example, in the foregoing embodiments, the address information and the like are recorded in advance in the form of emboss pits on the address servo areas 6 of the optical information recording medium 1. However, the address information and the like may be recorded in the following manner without providing the emboss pits in advance. In this case, the optical information recording medium 1 shall be configured such that the information recording layer 3 and the reflecting film 5 are next to each other without the air gap layer 4. Then, in the address servo areas 6 of this optical information recording medium 1, the information recording layer 3 is irradiated with laser light of high output selectively at a portion closer to the reflecting film 5. The portion is thereby selectively changed in refractive index so that address information and the like are recorded for formatting.

As described in the foregoing, according to the optical information recording apparatus or method of the invention, information is recorded on the information recording layer of the optical information recording medium by using the information light that is spatially modulated in phase based on the information to be recorded, and the recording-specific reference light. Then, according to the invention, when reproducing the information, the information recording layer is irradiated with the reproduction-specific reference light, and reproduction light thereby generated from the information recording layer is superimposed on the reproduction-specific reference light to generate composite light. Then, this composite light is detected to reproduce the information. Thus, according to the invention, the reproduction light and the reproduction-specific reference light need not be separated from each other for information reproduction. In addition, for information recording, the information light and the recording-specific reference light need not form a predetermined angle therebetween when they are incident on the recording medium. The invention therefore makes it possible to record information through the use of holography and allows a small configuration of the optical system for recording. Furthermore, since the invention uses the reproduction light and the reproduction-specific reference light to reproduce information, the reproduction-specific reference light will not cause a deterioration in the S/N ratio of the reproduced information. As a result, it becomes possible to improve the SIN ratio of the reproduced information.

In the optical information recording apparatus or method of the invention, the irradiation with the information light and the recording-specific reference light may be performed on the same side of the information recording layer so that the information light and the recording-specific reference light are arranged coaxially. In this case, it is possible to attain a smaller configuration of the optical system for recording.

The optical information recording apparatus or method of the invention may use recording-specific reference light that is spatially modulated in phase. This makes it possible to perform multiple recording by phase encoding multiplexing.

The optical information recording apparatus of the invention may be provided with a flying-type head body that accommodates the information light generating means, the recording-specific reference light generating means and the recording/reproducing optical system, and flies over the optical information recording medium. In this case, it becomes unnecessary to perform focus servo.

According to the optical information reproducing apparatus or method of the invention, the information recording layer, on which information is recorded in the form of an interference pattern resulting from interference between information light that is spatially modulated in phase based on information to be recorded, and recording-specific reference light, is irradiated with the reproduction-specific reference light, and then reproduction light thereby generated from the information recording layer is collected. The reproduction light is superimposed on the reproduction-specific reference light to generate composite light, and this composite light is detected. Thus, according to the invention, the reproduction light and the reproduction-specific reference light need not be separated from each other. The invention therefore makes it possible to reproduce information through the use of holography and allows a small configuration of the optical system for reproduction. Furthermore, since the invention uses reproduction light and the reproduction-specific reference light to reproduce information, the reproduction-specific reference light will not cause a deterioration in the S/N ratio of the reproduced information. As a result, it becomes possible to improve the S/N ratio of the reproduced information.

In the optical information reproducing apparatus or method of the invention, the irradiation with the reproduction-specific reference light and the collection of the reproduction light may be performed on the same side of the information recording layer so that the reproduction-specific reference light and the reproduction light are arranged coaxially. In this case, it is possible to attain a smaller configuration of the optical system for reproduction.

The optical information reproducing apparatus or method of the invention may use reproduction-specific reference light that is spatially modulated in phase. This makes it possible to reproduce information that is multiple-recorded by phase encoding multiplexing.

The optical information reproducing apparatus of the invention may be provided with a flying-type head body that accommodates the reproduction-specific reference light generating means, the recording/reproducing optical system and the detecting means, and flies over the optical information recording medium. In this case, it becomes unnecessary to perform focus servo.

According to the optical information recording/reproducing apparatus or method of the invention, for information recording, information is recorded on the information recording layer of the optical information recording medium by using the information light that is spatially modulated in phase based on the information to be recorded, and the recording-specific reference light. Then, for information reproduction, the information recording layer is irradiated with the reproduction-specific reference light, and the reproduction light thereby generated from the information recording layer is collected. The reproduction light is superimposed on the reproduction-specific reference light to generate composite light, and this composite light is detected. Thus, according to the invention, the reproduction light and the reproduction-specific reference light need not be separated from each other. In addition, for information recording, the information light and the recording-specific reference light need not form a predetermined angle therebetween when they are incident on the recording medium. The invention therefore makes it possible to record and reproduce information through the use of holography and allows a small configuration of the optical system for recording and reproduction. Furthermore, since the invention uses reproduction light and the reproduction-specific reference light to reproduce information, the reproduction-specific reference light will not cause a deterioration in the S/N ratio of the reproduced information. As a result, it becomes possible to improve the S/N ratio of the reproduced information.

In the optical information recording/reproducing apparatus or method of the invention, the irradiation with the information light, the recording-specific reference light and the reproduction-specific reference light and the collection of the reproduction light may be performed on the same side of the information recording layer so that the information light, the recording-specific reference light, the reproduction-specific reference light and the reproduction light are arranged coaxially. In this case, it is possible to attain a smaller configuration of the optical system for recording and reproduction.

The optical information recording/reproducing apparatus or method of the invention may use recording-specific reference light and reproduction-specific reference light that are spatially modulated in phase. This makes it possible to perform multiplex recording by phase encoding multiplexing and to reproduce information that is thus multiple-recorded.

The optical information recording/reproducing apparatus of the invention may be provided with a flying-type head body that accommodates the information light generating means, the recording-specific reference light generating means, the reproduction-specific reference light generating means, the recording/reproducing optical system and the detecting means, and flies over the optical information recording medium. In this case, it becomes unnecessary to perform focus servo.

It is apparent from the foregoing description that the invention may be carried out in various modes and may be modified in various ways. It is therefore to be understood that within the scope of equivalence of the appended claims the invention may be practiced in modes other than the foregoing best modes.

The invention claimed is:

1. An optical information recording apparatus for recording information on an optical information recording medium having an information recording layer in which information is recorded through the use of holography, the apparatus comprising:
    information light generating means for generating information light by spatially modulating a phase of light;
    recording-specific reference light generating means for generating recording-specific reference light by spatially modulating a phase of light;
    a recording optical system for irradiating the information recording layer with the information light generated by the information light generating means and the recording-specific reference light generated by the recording-specific reference light generating means so that the information is recorded in the information recording layer in the form of an interference pattern resulting from interference between the information light and the recording-specific reference light; and
    wherein the information light generating means spatially modulates the phase of the light in accordance with a phase modulation pattern determined based on the information to be recorded and a phase modulation pattern of the recording-specific reference light.

2. An optical information recording apparatus according to claim 1, wherein the recording optical system performs the irradiation with the information light and the recording-specific reference light on the same side of the information recording layer so that the information light and the recording-specific reference light are arranged coaxially.

3. An optical information recording apparatus according to claim 1, wherein the information light generating means sets the phase of the light after the modulation at either of two values.

4. An optical information recording apparatus according to claim 1, wherein the information light generating means sets the phase of the light after the modulation at any of three or more values.

5. An optical information recording apparatus according to claim 1, further comprising a flying-type head body that accommodates the information light generating means, the recording-specific reference light generating means and the recording optical system, and flies over the optical information recording medium.

6. An optical information recording method for recording information on an optical information recording medium having an information recording layer in which information is recorded through the use of holography, the method comprising:
the step of generating information light by spatially modulating a phase of light;
the step of generating recording-specific reference light by spatially modulating a phase of light;
the recording step in which the information recording layer is irradiated with the information light and the recording-specific reference light so that the information is recorded on the information recording layer in the form of an interference pattern resulting from interference between the information light and the recording-specific reference light; and
wherein, in the step of generating the information light, the phase of the light is spatially modulated in accordance with a phase modulation pattern determined based on the information to be recorded and a phase modulation pattern of the recording-specific reference light.

7. An optical information recording method according to claim 6, wherein, in the recording step, the irradiation with the information light and the recording-specific reference light is performed on the same side of the information recording layer so that the information light and the recording-specific reference light are arranged coaxially.

8. An optical information recording method according to claim 6, wherein, in the step of generating the information light, the phase of the light after the modulation is set at either of two values.

9. An optical information recording method according to claim 6, wherein, in the step of generating the information light, the phase of the light after the modulation is set at any of three or more values.

10. An optical information reproducing apparatus for reproducing information through the use of holography from an optical information recording medium having an information recording layer in which information is recorded in the form of an interference pattern resulting from interference between information light that is spatially modulated in phase based on information to be recorded, and recording-specific reference light, the apparatus comprising:
reproduction-specific reference light generating means for generating reproduction-specific reference light;
a reproducing optical system for irradiating the information recording layer with the reproduction-specific reference light generated by the reproduction-specific reference light generating means, collecting reproduction light that is generated from the information recording layer irradiated with the reproduction-specific reference light, and generating composite light by superimposing the reproduction light on the reproduction-specific reference light; and
detecting means for detecting the composite light generated by the reproducing optical system.

11. An optical information reproducing apparatus according to claim 10, wherein the reproducing optical system performs the irradiation with the reproduction-specific reference light and the collection of the reproduction light on the same side of the information recording layer so that the reproduction-specific reference light and the reproduction light are arranged coaxially.

12. An optical information reproducing apparatus according to claim 10, wherein the reproduction-specific reference light generating means generates the reproduction-specific reference light that is spatially modulated in phase.

13. An optical information reproducing apparatus according to claim 10, further comprising a flying-type head body that accommodates the reproduction-specific reference light generating means, the reproducing optical system and the detecting means, and flies over the optical information recording medium.

14. An optical information reproducing method for reproducing information through the use of holography from an optical information recording medium having an information recording layer in which information is recorded in the form of an interference pattern resulting from interference between information light that is spatially modulated in phase based on information to be recorded, and recording-specific reference light, the method comprising:
the step of generating reproduction-specific reference light;
the reproducing step in which the information recording layer is irradiated with the reproduction-specific reference light, reproduction light that is generated from the information recording layer irradiated with the reproduction-specific reference light is collected, and composite light is generated by superimposing the reproduction light on the reproduction-specific reference light; and
the step of detecting the composite light.

15. An optical information reproducing method according to claim 14, wherein, in the reproducing step, the irradiation with the reproduction-specific reference light and the collection of the reproduction light are performed on the same side of the information recording layer so that the reproduction-specific reference light and the reproduction light are arranged coaxially.

16. An optical information reproducing method according to claim 14, wherein the step of generating the reproduction-specific reference light generates the reproduction-specific reference light that is spatially modulated in phase.

17. An optical information recording/reproducing apparatus for recording information on an optical information recording medium having an information recording layer in which information is recorded through the use of holography, and for reproducing the information from the information recording medium, the apparatus comprising:
information light generating means for generating information light by spatially modulating a phase of light based on information to be recorded;
recording-specific reference light generating means for generating recording-specific reference light;
reproduction-specific reference light generating means for generating reproduction-specific reference light;
a recording/reproducing optical system for irradiating the information recording layer with the information light generated by the information light generating means and the recording-specific reference light generated by the recording-specific reference light generating means when recording information so that the information is recorded in the information recording layer in the form of an interference pattern resulting from interference between the information light and the recording-specific reference light, and irradiating the information recording layer with the reproduction-specific reference light generated by the reproduction-specific reference light generating means, collecting reproduction light that is generated from the information recording layer irradiated with the reproduction-specific reference light, and generating composite light by superimposing the reproduction light on the reproduction-specific reference light when reproducing information; and detecting means for detecting the composite light generated by the recording/reproducing optical system.

18. An optical information recording/reproducing apparatus according to claim 17, wherein the recording/reproducing optical system performs the irradiation with the information light, the recording-specific reference light and the reproduction-specific reference light and the collection of the reproduction light on the same side of the information recording layer so that the information light, the recording-specific reference light, the reproduction-specific reference light and the reproduction light are arranged coaxially.

19. An optical information recording/reproducing apparatus according to claim 18, wherein:

the information light generating means, the recording-specific reference light generating means, and the reproduction-specific reference light generating means respectively generate the information light, the recording-specific reference light, and the reproduction-specific reference light that are linearly polarized in the same direction; and the recording/reproducing optical system has: a quarter-wave plate for converting the information light and the recording-specific reference light from first linearly polarized light to circularly polarized light to irradiate the information recording layer with the same, and converting the reproduction light generated from the information recording layer from circularly polarized light to second linearly polarized light whose direction of polarization is orthogonal to that of the first linearly polarized light; and a polarization separation optical element for achieving separation between an optical path of the information light, the recording-specific reference light, and the reproduction-specific reference light yet to pass through the quarter-wave plate and an optical path of return light from the optical information recording medium that has passed through the quarter-wave plate, according to a difference in directions of polarization.

20. An optical information recording/reproducing apparatus according to claim 17, wherein the recording-specific reference light generating means generates the recording-specific reference light that is spatially modulated in phase, and the reproduction-specific reference light generating means generates the reproduction-specific reference light that is spatially modulated in phase.

21. An optical information recording/reproducing apparatus according to claim 20, wherein the information light generating means spatially modulates the phase of the light in accordance with a phase modulation pattern determined based on the information to be recorded and a phase modulation pattern of the recording-specific reference light.

22. An optical information recording/reproducing apparatus according to claim 17, further comprising a flying-type head body that accommodates the information light generating means, the recording-specific reference light generating means, the reproduction-specific reference light generating means, the recording/reproducing optical system and the detecting means, and flies over the optical information recording medium.

23. An optical information recording/reproducing method for recording information on an optical information recording medium having an information recording layer in which information is recorded through the use of holography, and for reproducing the information from the information recording medium, the method comprising:

the step of generating information light by spatially modulating a phase of light based on information to be recorded;

the step of generating recording-specific reference light;

the recording step in which the information recording layer is irradiated with the information light and the recording-specific reference light so that the information is recorded on the information recording layer in the form of an interference pattern resulting from interference between the information light and the recording-specific reference light;

the step of generating reproduction-specific reference light;

the reproducing step in which the information recording layer is irradiated with the reproduction-specific reference light, reproduction light that is generated from the information recording layer irradiated with the reproduction-specific reference light is collected, and composite light is generated by superimposing the reproduction light on the reproduction-specific reference light; and the step of detecting the composite light.

24. An optical information recording/reproducing method according to claim 23, wherein the irradiation with the information light, the recording-specific reference light and the reproduction-specific reference light and the collection of the reproduction light are performed on the same side of the information recording layer so that the information light, the recording-specific reference light, the reproduction-specific reference light and the reproduction light are arranged coaxially.

25. An optical information recording/reproducing method according to claim 23, wherein the step of generating the recording-specific reference light generates the recording-specific reference light that is spatially modulated in phase, and the step of generating the reproduction-specific reference light generates the reproduction-specific reference light that is spatially modulated in phase.

26. An optical information recording/reproducing method according to claim 25, wherein, in the step of generating the information light, the phase of the light is spatially modulated in accordance with a phase modulation pattern determined based on the information to be recorded and a phase modulation pattern of the recording-specific reference light.

* * * * *